(12) United States Patent
Huibers et al.

(10) Patent No.: US 6,529,310 B1
(45) Date of Patent: Mar. 4, 2003

(54) DEFLECTABLE SPATIAL LIGHT MODULATOR HAVING SUPERIMPOSED HINGE AND DEFLECTABLE ELEMENT

(75) Inventors: Andrew G. Huibers, Mountain View, CA (US); Peter J. Heureux, Felton, CA (US)

(73) Assignee: Reflectivity, Inc., Sunnyvale, CA (US)

( * ) Notice: Subject to any disclaimer, the term of this patent is extended or adjusted under 35 U.S.C. 154(b) by 285 days.

(21) Appl. No.: 09/631,536

(22) Filed: Aug. 3, 2000

Related U.S. Application Data

(63) Continuation-in-part of application No. 09/437,586, filed on Nov. 9, 1999, now Pat. No. 6,172,797, which is a continuation of application No. 09/160,361, filed on Sep. 24, 1998, now Pat. No. 6,046,840.
(60) Provisional application No. 60/178,903, filed on Jan. 28, 2000.

(51) Int. Cl.$^7$ .......................... G02B 26/00; G02B 26/08
(52) U.S. Cl. ..................... 359/291; 359/295; 359/223
(58) Field of Search ................... 359/223, 291, 359/295, 298

(56) References Cited

U.S. PATENT DOCUMENTS

| | | | |
|---|---|---|---|
| 3,600,798 A | 8/1971 | Lee | 29/592.1 |
| 3,746,911 A | 7/1973 | Nathanson et al. | 348/771 |
| 4,229,732 A | 10/1980 | Hartstein et al. | 340/815.4 |

(List continued on next page.)

OTHER PUBLICATIONS

Jaecklin, "Line–Addressable Torsional Micromirrors for Light Modulator Arrays", Sensor and Actuators A, 41–42, Elsevier Science, pp. 324–329.

Gerhard–Multhaupt et al., "Light–Valve Projection Displays—An Introduction", Displays, vol. 16, No. 1, 1995, Elsevier Science B.V., pp. 5–7.

Gerhard–Multhaupt, "Light–Valve Technologies for High–Definition Television Projection Displays", Displays, 1991, vol. 12, No. 3/4, pp. 115–128.

Peterson, K.E., "Micromechanical Light Modulator Array Fabricated on Silicon", Applied Physics Letters, American Institute of Physics, vol. 31 No. 8, Oct. 15, 1977, pp. 521–523.

(List continued on next page.)

*Primary Examiner*—Georgia Epps
*Assistant Examiner*—David N. Spector

(57) ABSTRACT

A spatial light modulator having a substrate holding an array of deflectable (e.g. mirror) elements. The deflectable elements are deflectably coupled to the substrate via corresponding hinges, each hinge being disposed on a side of the deflectable element opposite to the side on which the substrate is disposed. By placing the hinge in this way the fill factor of the array is improved. The hinge can be provided flush against the deflectable element, or it can be provided with a gap between the deflectable element and the hinge. The hinge can be attached via one or more posts or walls connecting to the substrate, and with a flexible or deformable portion that is substantially or entirely hidden from view when viewed through the substrate (e.g. a glass substrate). In one embodiment, the hinge is connected to the undersides of both the substrate and the deflectable element, and connects towards a center part of the deflectable element. In this way, a longer hinge is provided thus reducing strain on any one part of the hinge. Advantages of the present invention include: (1) increased fill factor as the torsion hinge is hidden behind the reflective plate; (2) increased contrast due to fewer scattering optical surfaces exposed, and due to a greater ability to control their angle and geometry; and (3) increased geometric flexibility to optimize electro-mechanical performance and robustness with respect to manufacturing.

99 Claims, 14 Drawing Sheets

U.S. PATENT DOCUMENTS

| | | | |
|---|---|---|---|
| 4,383,255 A | 5/1983 | Grandjean et al. | 345/109 |
| 4,492,435 A | 1/1985 | Banton et al. | 359/295 |
| 4,566,935 A | 1/1986 | Hornbeck | 438/29 |
| 4,571,603 A | 2/1986 | Hornbeck et al. | 347/239 |
| 4,596,992 A | 6/1986 | Hornbeck | 347/134 |
| 4,662,746 A | 5/1987 | Hornbeck | 359/223 |
| 4,710,732 A | 12/1987 | Hornbeck | 359/291 |
| 4,954,789 A | 9/1990 | Sampsell | 359/318 |
| 5,078,479 A | 1/1992 | Vuilleumier | 359/290 |
| 5,212,582 A | 5/1993 | Nelson | 359/224 |
| 5,216,537 A | 6/1993 | Hornbeck | 438/23 |
| 5,311,360 A | 5/1994 | Bloom et al. | 359/572 |
| 5,389,182 A | 2/1995 | Mignardi | 156/34 |
| 5,535,047 A | 7/1996 | Hornbeck | 359/291 |
| 5,552,924 A | 9/1996 | Tregilgas | 359/224 |
| 5,579,149 A | 11/1996 | Moret et al. | 359/223 |
| 5,768,009 A | 6/1998 | Little | 359/293 |
| 5,784,190 A | 7/1998 | Worley | 359/291 |
| 5,808,780 A | 9/1998 | McDonald | 359/290 |
| 5,835,256 A | 11/1998 | Huibers | 359/291 |
| 6,028,689 A | 2/2000 | Michalicek et al. | 359/224 |
| 6,031,657 A | 2/2000 | Robinson et al. | 359/293 |
| 6,046,840 A | 4/2000 | Huibers | 359/291 |
| 6,172,797 B1 | 1/2001 | Huibers | 359/291 |
| 6,337,760 B1 * | 1/2002 | Huibers et al. | 359/291 |
| 6,356,378 B1 * | 3/2002 | Huibers | 359/291 |
| 6,396,619 B1 * | 5/2002 | Huibers et al. | 359/291 |
| 2001/0040675 A1 * | 11/2001 | True et al. | 355/77 |
| 2002/0132389 A1 * | 9/2002 | Patel et al. | 438/97 |

OTHER PUBLICATIONS

Cadman et al., "New Micromechanical Display Using Metallic Thin Films", IEEE Electron Device Letters, Jan. 1983, vol. EDL–4 No. 1, pp. 3–4.

Thomas et al., "The Mirror Matrix Tube: A Novel Light Valve for Projection Displays", IEEE Transactions on Electron Devices, vol. ED–22 No. 9, Sep. 1975, pp. 765–775.

Hornbeck, "Digital Light Processing (™) for High–Brightness, High Resolution Applications", Texas Instruments, Inc., date unknown, pp. 1–14.

Yoder, "The Digital Display Technology of the Future", Texas Instruments, Inc., date unknown, pp. 1–11.

Peterson, "Silicon Torsional Scanning Mirror", IBM J. Res. Develop., vol. 24, No. 5, Sep. 1980 pp. 631–637.

* cited by examiner

DEFLECTABLE SPATIAL LIGHT MODULATOR HAVING SUPERIMPOSED HINGE AND DEFLECTABLE ELEMENT

RELATED CASES

The instant application is a continuation-in-part of U.S. patent application Ser. No. 09/437,586, (now U.S. Pat. No. 6,172,797) filed on Nov. 9, 1999, entitled "A Double Substrate Reflective Spatial Light Modulator with Self-Limiting Micro-Mechanical Elements," by Huibers, which is a continuation of U.S. patent application Ser. No. 09/160,361 (now U.S. Pat. No. 6,046,840) filed on Sep. 24, 1998, of the same title, the subject matter of each being incorporated herein by reference. This application is also related to provisional application No. 60/178,903, filed Jan. 28, 2000, entitled "Structure and Process for Spatial Light Modulator: Designs Using Two Sacrificial Layers," by Huibers, the subject matter of which is also incorporated herein by reference.

FIELD OF THE INVENTION

The present invention pertains generally to the field of micro-electromechanical systems (MEMS). More specifically, the present invention pertains to the field of MEMS spatial light modulators, and systems, such as display projection systems, printing systems, and light beam switching systems that utilize MEMS spatial light modulators.

BACKGROUND OF THE INVENTION

Spatial light modulators (SLMs) are transducers that modulate an incident beam of light in a spatial pattern that corresponds to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

An early SLM designed for use in a projection display system is described by Nathanson, U.S. Pat. No. 3,746,911. The individual pixels of the SLM are addressed via a scanning electron beam as in a conventional direct-view cathode ray tube (CRT). Instead of exciting a phosphor, the electron beam charges deflectable reflective elements arrayed on a quartz faceplate. Elements that are charged bend towards the faceplate due to electrostatic forces. Bent and unbent elements reflect parallel incident light beams in different directions. Light reflected from unbent elements is blocked with a set of Schlieren stops, while light from bent elements is allowed to pass through projection optics and form an image on a screen. Another electron-beam-addressed SLM is the Eidophor, described in E. Baumann, "The Fischer large-screen projection system (Eidophor)" 20 J.SMPTE 351 (1953). In that system, the active optical element is an oil film, which is periodically dimpled by the electron beam so as to diffract incident light. A disadvantage of the Eidophor system is that the oil film is polymerized by constant electron bombardment and oil vapors result in a short cathode lifetime. A disadvantage of both of these systems is their the use of bulky and expensive vacuum tubes.

A SLM in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar SLM incorporating a two-dimensional array is described by Hartstein and Peterson, U.S. Pat. No. 4,229,732. Although the switching voltage of this SLM is lowered by connecting the deflectable mirror elements at only one corner, the device has low light efficiency due to the small fractional active area. In addition, diffraction from the addressing circuitry lowers the contrast ratio (modulation depth) of the display.

Another SLM design is the Grating Light Value (GLV) described by Bloom, et. al., U.S. Pat. No. 5,311,360. The GLV's deflectable mechanical elements are reflective flat beams or ribbons. Light reflects from both the ribbons and the substrate. If the distance between surface of the reflective ribbons and the reflective substrate is one-half of a wavelength, light reflected from the two surfaces adds constructively and the device acts like a mirror. If this distance is one-quarter of a wavelength, light directly reflected from the two surfaces will interfere destructively and the device will act as a diffraction grating, sending light into diffracted orders. Construction of the GLV differs substantially from the DMD. Instead of using active semiconductor circuitry at each pixel location, the approach in the '360 patent relies on an inherent electromechanical bistability to implement a passive addressing scheme. The bistability exists because the mechanical force required for deflection is roughly linear, whereas the electrostatic force obeys an inverse square law. As a voltage bias is applied, the ribbons deflect. When the ribbons are deflected past a certain point, the restoring mechanical force can no longer balance the electrostatic force and the ribbons snap to the substrate. The voltage must be lowered substantially below the snapping voltage in order for the ribbons to return to their undeflected position. This latching action allows driver circuitry to be placed off-chip or only at the periphery. Thus addressing circuitry does not occupy the optically active part of the array. In addition, ceramic films of high mechanical quality, such as LPCVD (low pressure chemical vapor deposition) silicon nitride, can be used to form the ribbons. However, there are several difficulties with the GLV. One problem is stiction: since the underside of the deflected ribbons contacts the substrate with a large surface area, the ribbons tend to stick to the substrate. Another problem is that a passive addressing scheme might not be able to provide high frame rates (the rate at which the entire SLM field is updated). In addition, with a passive addressing scheme, the ribbons deflect slightly even when off. This reduces the achievable contrast ratio. Also, even though the device is substantially planar, light is scattered, as in the DMD, from areas between the pixels, further reducing the contrast ratio.

Another diffraction-based SLM is the Microdisplay, described in P. Alvelda, "High-Efficiency Color Microdisplays" 307 SID 95 Digest. That SLM uses a liquid crystal layer on top of electrodes arrayed in a grating pattern. Pixels can be turned on and off by applying appropriate voltages to alternating electrodes. The device is actively addressed and potentially has a better contrast ratio than the GLV. However, the device, being based on the birefringence of liquid crystals, requires polarized light, reducing its optical efficiency. Furthermore, the response time of liquid crystals is slow. Thus, to achieve color, three devices—one dedicated for each of the primary colors—must be used in parallel. This arrangement leads to expensive optical systems.

A silicon-based micro-mechanical SLM with a large fractional optically active area is the Digital Mirror Device (DMD), developed by Texas Instruments and described by Hornbeck, U.S. Pat. No. 5,216,537 and other references. One of the implementations includes a square aluminum plate suspended via torsion hinges above addressing electrodes. A second aluminum plate is built on top of the first and is used as mirror. Although increasing manufacturing complexity, the double plate aluminum structure is required to provide a reasonably flat mirror surface and cover the underlying circuitry and hinge mechanism. This is essential in order to achieve an acceptable contrast ratio. The entire aluminum structure is released via oxygen plasma etching of a polymer sacrificial layer. Aluminum can be deposited at low temperatures, avoiding damage to the underlying CMOS addressing circuitry. However, the hinges attaching the mirrors to the substrate are also made of aluminum, which is very susceptible to fatigue and plastic deformation.

Therefore, what is needed is a spatial light modulator that has a high resolution, a high fill factor and a high contrast ratio. What is further needed is a spatial light modulator that does not require polarized light, hence is optically efficient, and that is mechanically robust.

SUMMARY OF THE DISCLOSURE

Accordingly, the present invention provides a spatial light modulator that has a higher resolution and an increased fill factor. The present invention also provides a spatial light modulator that has an increased contrast ratio. The present invention further provides a spatial light modulator that operates in the absence of polarized light and that has improved electromechanical performance and robustness with respect to manufacturing.

According to one embodiment of the present invention, the spatial light modulator has an optically transmissive substrate and a semiconductor substrate. An array of reflective elements are suspended from underneath the optically transmissive substrate, and are positioned directly across from the semiconductor substrate. The semiconductor substrate includes an array of electrodes and electronic circuitry for selectively deflecting individual reflective elements by electrostatic force. In operation, as individual reflective element deflects, light beams that are incident to and reflected back through the optically transmissive substrate are spatially modulated.

In accordance with one embodiment, each reflective element has a front surface that faces the optically transmissive substrate and a back surface that faces the semiconductor substrate. Each reflective element is deflectably attached to the optically transmissive substrate by means of a mirror support structure. The mirror support structure includes one or more contact points that are attached (directly or indirectly) to the optically transmissive substrate. The mirror support structure also includes a torsion hinge that extends across the back surface of the reflective element, attaching thereto at one or more places.

The mirror support structure of one embodiment is reinforced with deflection stoppers configured for resisting deflection of the reflective element beyond a pre-determined tilt angle. Specifically, the deflection stoppers are configured such that, when the reflective element is deflected to the pre-determined tilt angle, the reflective element can come into contact with the deflection stoppers. In addition, one end of the reflective element will come into contact with the optically transmissive substrate. In this way, mechanical robustness of the mirror support structure is significantly improved. Moreover, contrast of the spatial light modulator is increased due to a greater ability to control the tilt angle of the reflective elements. The reflective element of the present embodiment may also include bump(s) positioned along a substrate-touching edge such that the area of contact between the reflective element and the substrate is reduced.

In furtherance of the present invention, one embodiment of the mirror support structure includes an attraction electrode that is attached to the back surface of the reflective element. When a voltage bias is applied between the attraction electrode and a corresponding actuating electrode on the semiconductor substrate, the attraction electrode will be pulled towards the actuating electrode, causing the reflective element to deflect. In one embodiment, the mirror support structure and the attraction electrode are composed of a same conductive laminate. Therefore, the reflective element needs not be conductive (though the reflective element, in another embodiment, can be conductive and act as the electrode). Consequently, mechanical and reflective properties of the reflective element can be optimized without regard to conductivity. Fabrication flexibility is also increased because the present embodiment does not require a metal coating step after sacrificial silicon layers are removed.

Embodiments of the present invention include the above and further include a spatial light modulator fabrication process. In one embodiment, the process includes the steps of: (a) depositing a sacrificial (e.g. silicon) layer on an optically transmissive substrate; (b) depositing a reflective laminate on the sacrificial layer; (c) pattern-etching the reflective laminate to define a reflective element; (d) depositing another sacrificial (e.g. silicon) layer; (e) pattern-etching the second sacrificial layer to expose a portion of the reflective element; (f) etching a pattern of holes through the sacrificial layers such that subsequent layers can be attached to the optically transmissive substrate via the holes; (g) depositing a hinge-electrode laminate layer on the second sacrificial layer and on the exposed portion of the reflective element; (h) pattern-etching the hinge-electrode laminate to define a hinge-electrode that is attached to the optically transmissive substrate through the holes and that is attached to the exposed portion of the reflective element; (i) etching the first sacrificial layer and the second sacrificial layer to release the reflective element; (j) forming addressing circuitry and electrodes on a semiconductor substrate; and (k) aligning and joining the optically transmissive substrate and the semiconductor substrate.

In cross section, the spatial light modulator has an optically transmissive substrate, a first gap below the optically transmissive substrate, a deflectable element below the first gap, a second gap below the deflectable element, a hinge below the second gap, a third gap below the hinge, and a second (e.g. circuit) substrate below the third gap. The hinge is substantially entirely blocked from view by the deflectable element (when viewing through the optically transmissive substrate). As such, the hinge is disposed on a side of the deflectable element opposite to that of the optically transmissive substrate. The hinge is connected to the bottom surface of the deflectable element (not on the edges of the deflectable element in most cases). Posts or walls can be provided which extend from the hinge to the optically transmissive substrate. The hinge can extend across the middle of the deflectable element, with the same area of deflectable element on either side (or the hinge could divide the deflectable element in other ways, e.g. ⅓ on one side and ⅔ on the other). With some deflectable element extending on either side of the hinge, movement of one side of the deflectable element in one direction results in movement of the other side of the deflectable element in the other direction.

The hinge can also be provided flush against the deflectable element (though still with the deflectable element between the hinge and the optically transmissive substrate). Preferably, however, the hinge is connected to a center portion of the deflectable element so as to allow for an elongated hinge (thus reducing flexing, torqueing and/or stress to any one part of the hinge). The deflectable element can be provided with a laminate support structure which can comprise multiple layers of dielectric material. Also, the deflectable element can comprise a layer which is both reflective and conductive (e.g. a metal layer such as gold or aluminum) or separate reflective and conductive layers. The deflectable element and hinge can be formed by LPCVD deposition, whereas the circuit substrate utilized for actuating the deflectable element can be formed using standard VLSI/CMOS processes.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Accordingly, the present invention provides a SLM structure that has an improved fill factor (e.g., ratio between reflective areas and non-reflective areas). The present invention also provides a deflectable micro-mirror structure that does not require the mirror plate to be conductive. The present invention further provides a micro-mirror structure that is mechanically robust and easy to manufacture. These and other advantages of the present invention would become more apparent in the description below.

Figure 1:
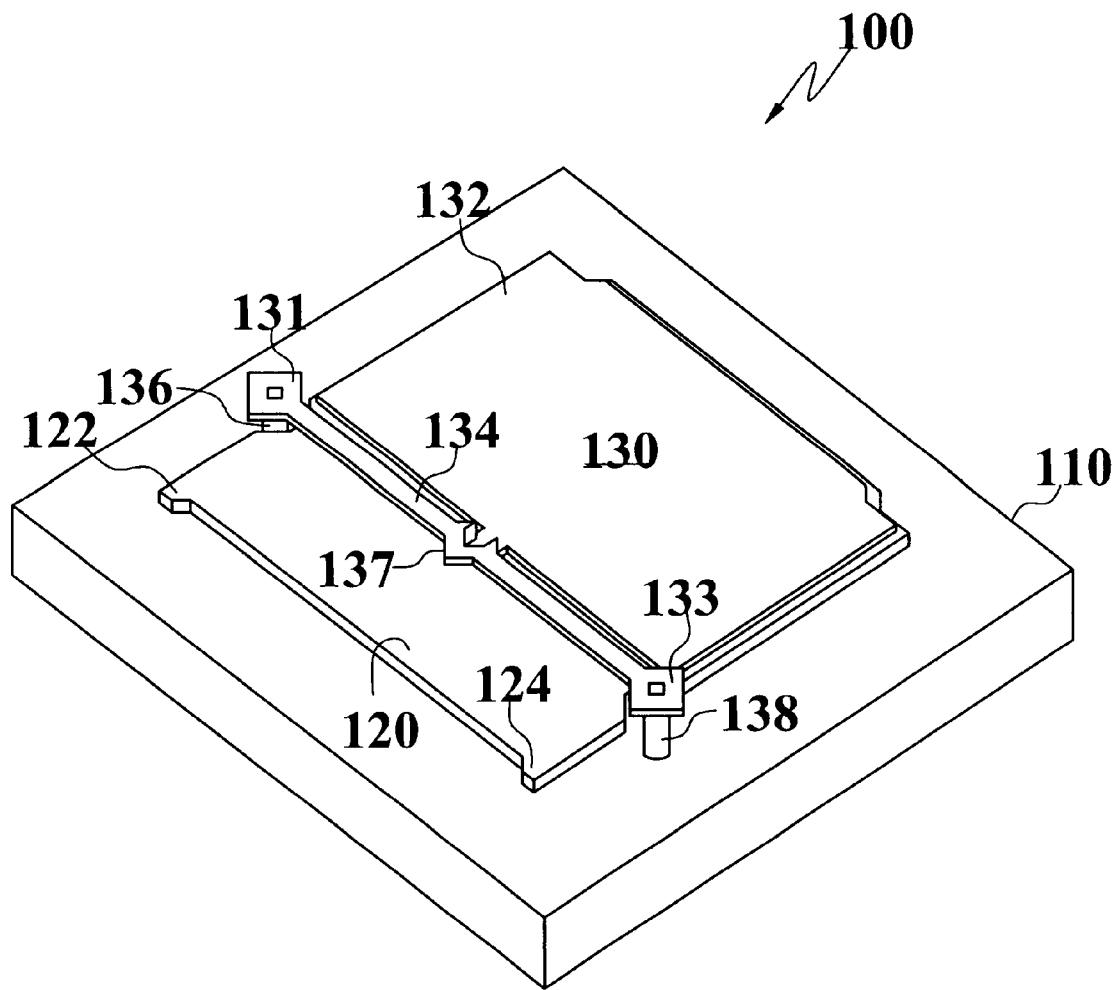
FIG. 1 illustrates a deflectable micro-mirror structure that may be incorporated as part of a spatial light modulator in accordance with one embodiment of the present invention.
Figure 2:
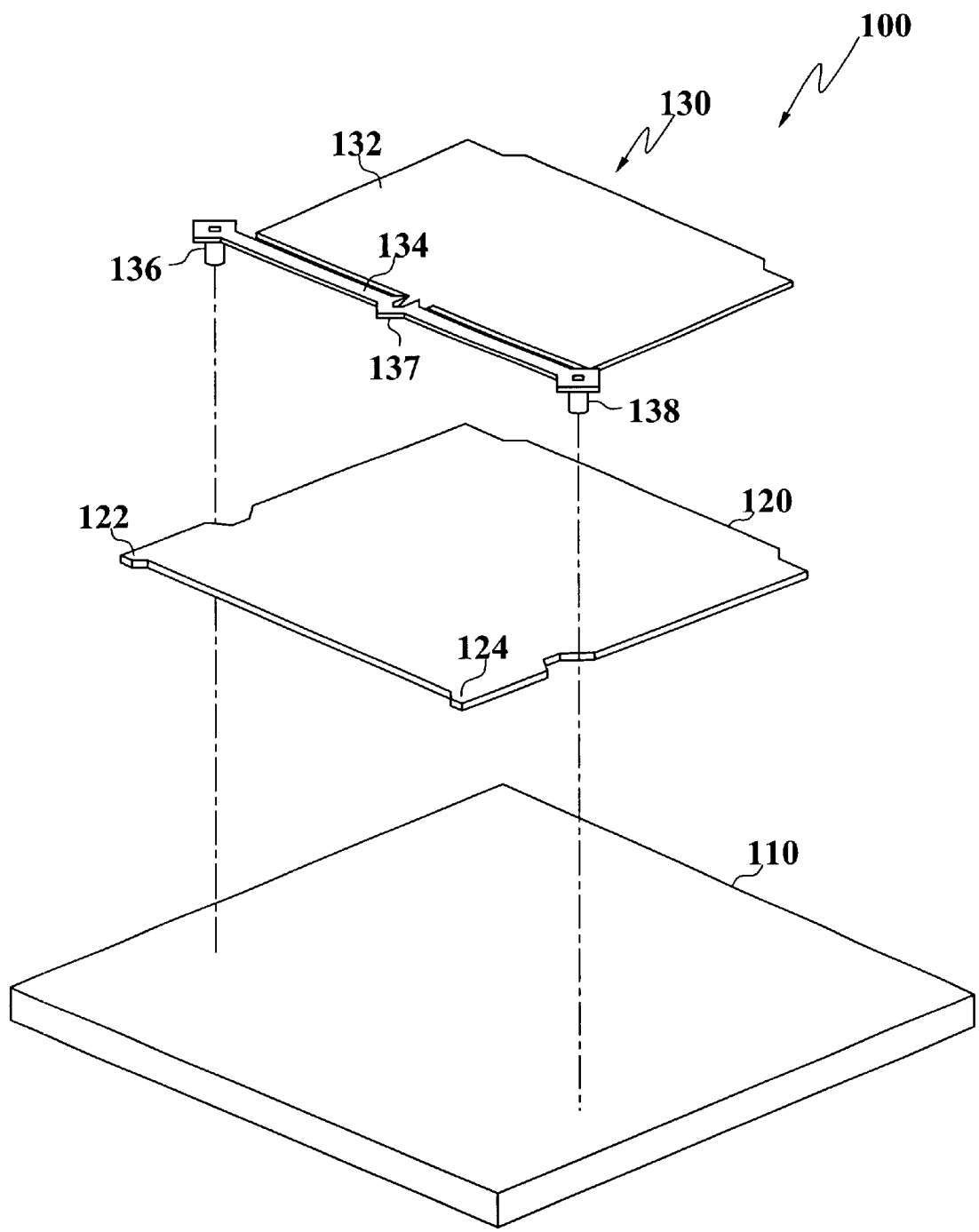
FIG. 2 illustrates an exploded view of the deflectable micro-mirror structure of FIG. 1.

FIG. 1 illustrates a deflectable micro-mirror structure 100 in accordance with one embodiment of the present invention. FIG. 2 illustrates an exploded view of the deflectable micro-mirror structure 100. It should be appreciated that micro-mirror structure 100 is part of a mirror array. However, for simplicity, other micro-mirror structures of the array are not shown FIG. 1. It should be appreciated that the number of mirror structures within a mirror array may be very large. For example, in a typical SLM implementation having 1024×768 pixels, the mirror array may have more than seven hundred fifty thousand micro-mirror structures. Additionally, it should be noted that the semiconductor substrate containing electronic circuitry for actuating the micro-mirror structure 100 is not illustrated in FIGS. 1 and 2 to avoid obscuring aspects of the present embodiment.

In the embodiment as shown in FIGS. 1 and 2, a mirror plate 120 of micro-mirror structure 100 is suspended above, and deflectably coupled to, optically transmissive substrate 110 by means of a mirror support structure 130. Mirror plate 120 has a reflective front surface that faces the optically transmissive substrate 110, and a back surface that faces the semiconductor substrate. In one embodiment, mirror plate 120 is substantially rigid and may be made up of a laminate having layers of silicon nitride and aluminum.

With reference still to FIGS. 1 and 2, mirror support structure 130 includes two hinge supports 136 and 138 attached to the optically transmissive substrate 110. The mirror support structure 130 also includes a torsion hinge 134 that extends across and attaches to the back surface of mirror plate 120. Also attached to the back surface of mirror plate 120 is an electrode 132. In the embodiment as illustrated, electrode 132 is electrically conductive and is connected to torsion hinge 134 via a support 137. Support 137, as shown, is shorter than hinge supports 136 and 138 such that mirror plate 120 is spaced apart from substrate 110 when undeflected.

Also illustrated in FIGS. 1 and 2 are deflection stoppers 131 and 133 that are configured for resisting deflection of mirror plate 120 beyond a pre-determined tilt angle. Particularly, when mirror plate 120 is deflected to the pre-determined tilt angle, part of mirror plate 120 will come into contact with deflection stoppers 131 and 133. In addition, in the present embodiment, micro-mirror structure 100 is configured such that, when the deflecting mirror plate 120 comes into contact with deflection stoppers 131 and 133, the mirror plate 120 will also come into contact with optically transmissive substrate 110. In the illustrated embodiment, mirror plate 120 includes bumps 122 and 124 positioned along the substrate-touching edge such that the area of contact between mirror plate 120 and substrate 110 is reduced.

Figure 3A:
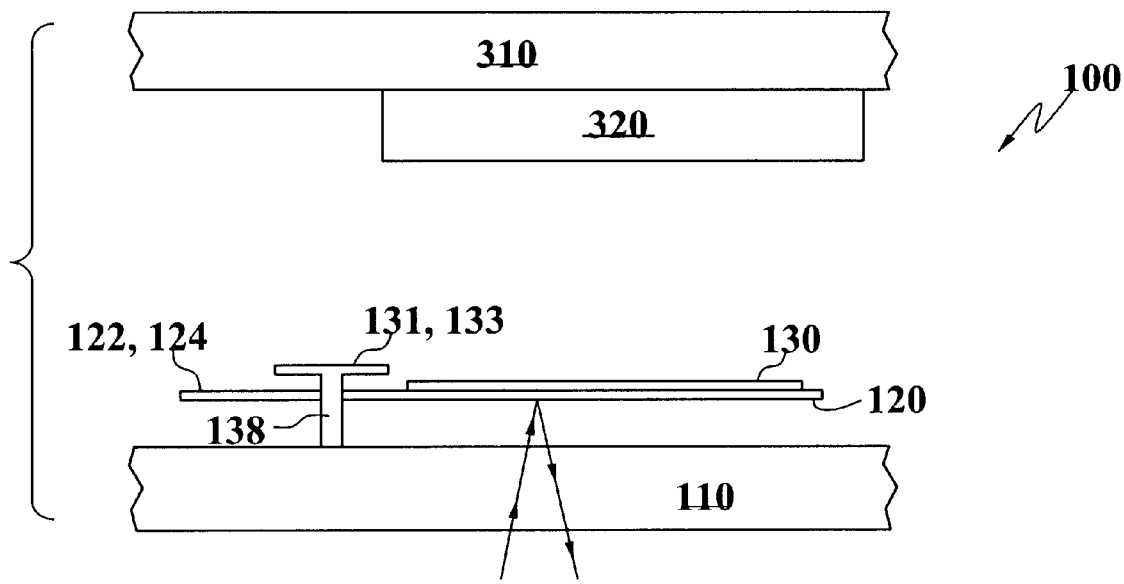
FIGS. 3A and 3B illustrate a deflection stopping mechanism of the micro-mirror structure of FIG. 1 in accordance with one embodiment of the present invention.
Figure 3B:
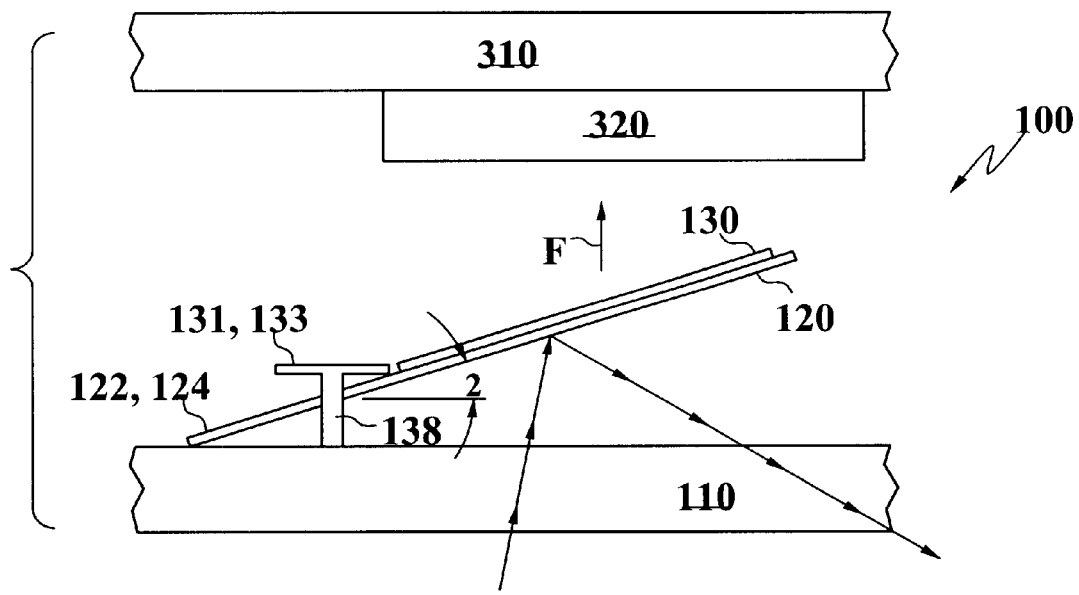

FIGS. 3A and 3B illustrate a deflection stopping mechanism of micro-mirror structure 100 in accordance with one embodiment of the present invention. FIG. 3A illustrates a side-view of micro-mirror structure 100 when mirror plate 120 is undeflected. FIG. 3B illustrates a side-view of micro-mirror structure 100 when mirror plate 120 is deflected to a pre-determined tilt angle, θ. Also illustrated are semiconductor substrate 310 and one or more attraction electrodes 320 for deflecting mirror plate 120.

As shown in FIG. 3A, when undeflected, mirror plate 120 is supported above optically transmissive substrate 110. However, in FIG. 3B, when a voltage bias between attraction electrode 320 and electrode 130 is applied, an electrostatic force F is generated, causing mirror plate 120 to deflect towards semiconductor substrate 310. Deflection of mirror plate 120 is stopped at a pre-determined tilt angle, or deflection angle, θ. As illustrated in FIG. 3B, mirror plate 120 comes into contact with deflection stoppers 131/133, and bumps 122/124 come into contact with substrate 110 at tilt angle θ.

In one embodiment, the tilt angle θ at which bumps 122/124 come into contact with substrate 110 is approximately 15°. However, it should be appreciated that the tilt angle θ is dependent on the geometry and dimensions of the micro-mirror structure and that many other tilt angles are within the scope of the present invention. Further, it should be noted that the angle at which mirror plate 120 comes into contact with deflection stoppers 131/133 may be slightly different from the angle at which bumps 122/124 come into contact with substrate 110. For instance, in another embodiment of the present invention, deflection stoppers may be used as a safeguard against excessive stretching of the torsion hinge. Therefore, in that embodiment, the angle at which the mirror plate comes into contact with the deflection stoppers may be slightly larger than the angle at which the mirror plate comes into contact with the substrate. Or, only the deflection stoppers could be used to stop the movement of the mirror plate. Therefore, it can be seen that preferably there are two stopping mechanisms (e.g. the stop against the substrate, and the stop against the deflection stopper). The deflectable element can abut against both stopping mechanisms at the same time, or one of the stopping mechanisms can be a "back-up" stopping mechanism, and be constructed to stop the deflectable element at an angle of deflection greater than the main stopping mechanism (e.g. in the case where the main mechanism fails, the deflectable element changes shape over time, etc.).

Figure 6:
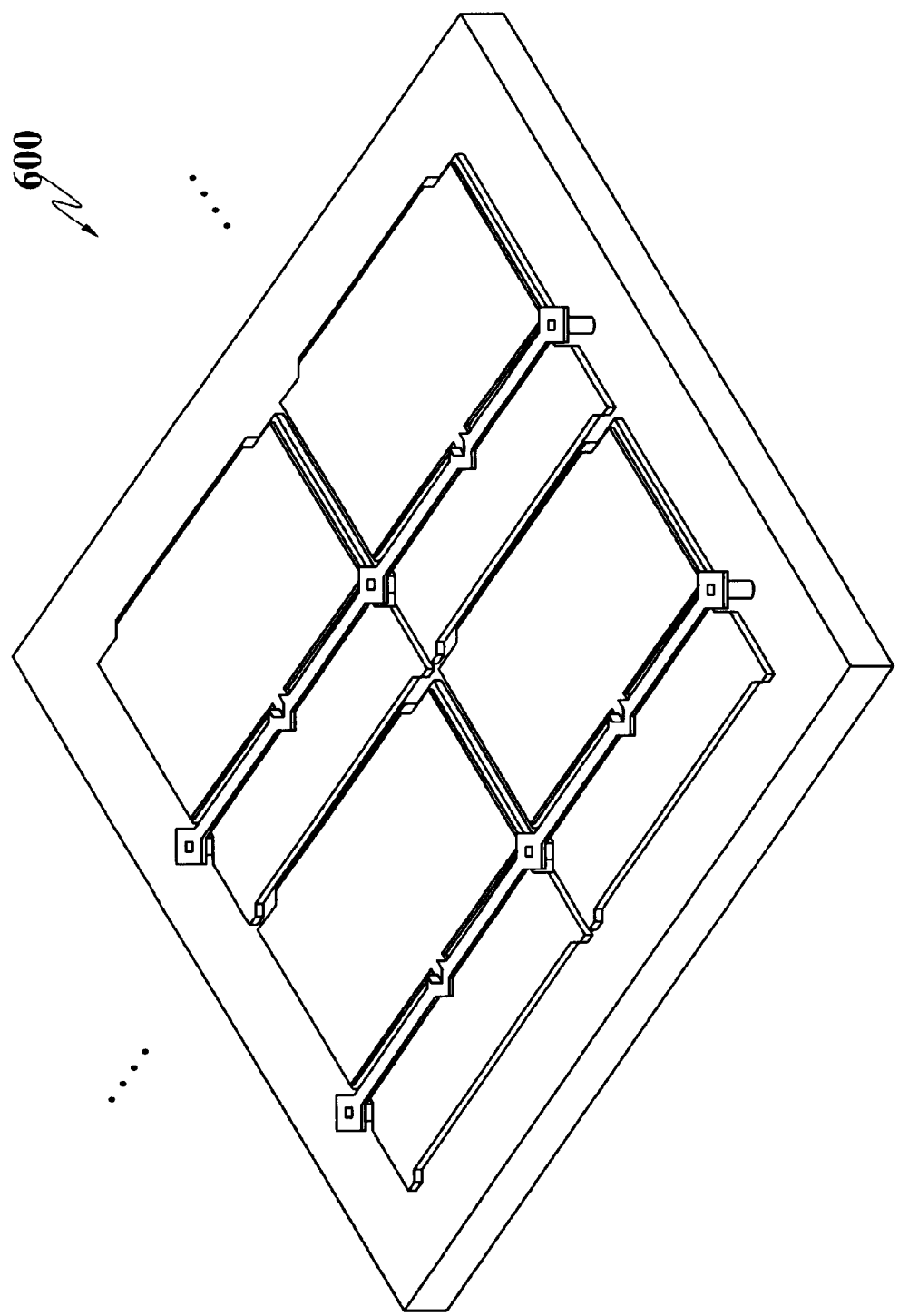
FIG. 6 illustrates an isometric perspective view of a small section of an exemplary mirror array that includes a micro-mirror structure of FIG. 1 according to one embodiment of the present invention.

A small section of an exemplary mirror array 600 according to one embodiment of the present invention is shown in FIG. 6. As illustrated, because the torsion hinges are attached to the back surface of the mirror plates, the fill factor of the array 600 is very high. Almost the entire surface of the optically transmissive substrate 610 can be covered with reflective surfaces.

Figure 4:
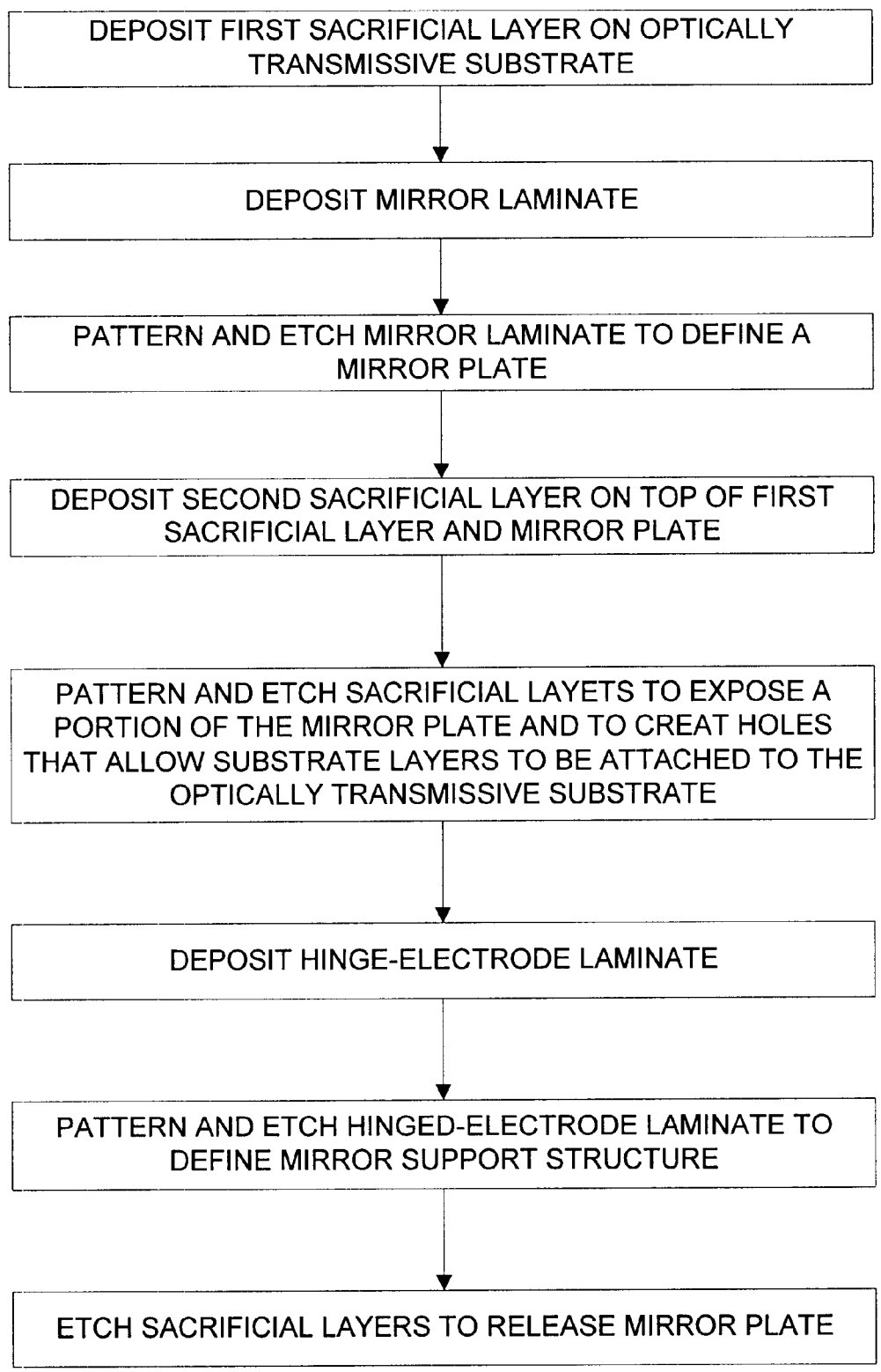
FIG. 4 is a flow diagram illustrating steps of a fabrication process for producing micro-mirror structures according to one embodiment of the present invention.

FIG. 4 is a flow diagram illustrating steps of a fabrication process 400 for producing micro-mirror structures according to one embodiment of the present invention. In the present embodiment, micro-mirror structures (e.g., structure 100) are formed on top of an optically transmissive substrate (e.g., substrate 110), which is made from glass or other materials that can withstand subsequent processing temperatures.

At shown in FIG. 4, at step 410, a first sacrificial layer (of e.g. silicon) is deposited on the optically transmissive substrate. In the present embodiment, the first sacrificial layer of silicon is approximately 5000A to 8000A (or even over 20,000A) thick. Other sacrificial material (e.g. polymers) other than silicon could be used.

At step 420, mirror laminate is deposited on the first sacrificial layer. In one embodiment, the mirror laminate includes a layer of aluminum sandwiched by two layers of silicon nitride. In other embodiments, the mirror laminate may include only a layer of aluminum and a layer of silicon nitride. Or, a multi-layer arrangement with multiple layers of aluminum and/or silicon nitride could be used. Other materials besides aluminum (such as other conductive and reflective metals) could be used. And, other materials besides silicon nitride are envisioned (e.g. silicon dioxide). In a typical implementation, each silicon nitride layer is approximately 1400A thick, and the aluminum layer is approximately 700A thick. Further, to enhance the reflectivity of the mirror laminate, one or more dielectric films that act as a reflective coating may be deposited on the mirror laminate.

Figure 5A:
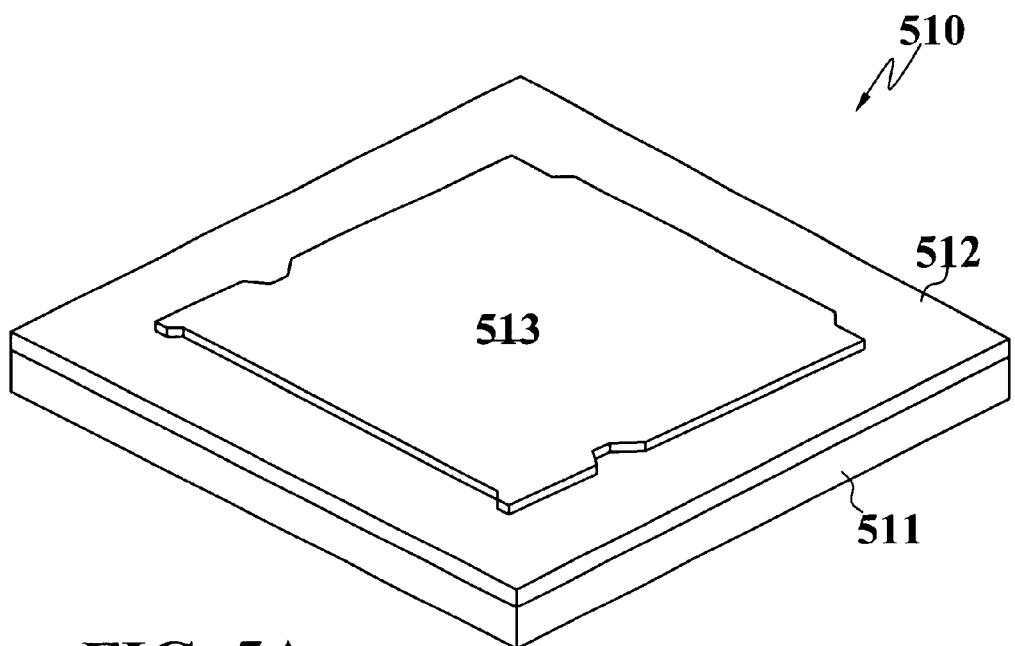
FIG. 5A illustrates an isometric perspective view of a portion of a substrate after a mirror patterning step of the fabrication process of FIG. 4.

At step 430, the mirror laminate is patterned to define a mirror plate. An isometric perspective view of a portion of a substrate after step 430 is illustrated in FIG. 5A. Particularly, an optically transmissive substrate 511, a sacrificial layer 512 and a mirror plate 513 are shown. It should also be noted that, in a typical SLM implementation in accordance with the present invention, an entire array of micro-mirrors are fabricated at the same time. For simplicity, other mirror plates that are formed on the substrate 511 are not illustrated.

With reference again to FIG. 4, at step 440, a second sacrificial silicon layer is deposited on top of the first sacrificial silicon layer and the mirror plate. In one embodiment, the second sacrificial silicon layer is approximately 2500–5000A thick.

Figure 5B:
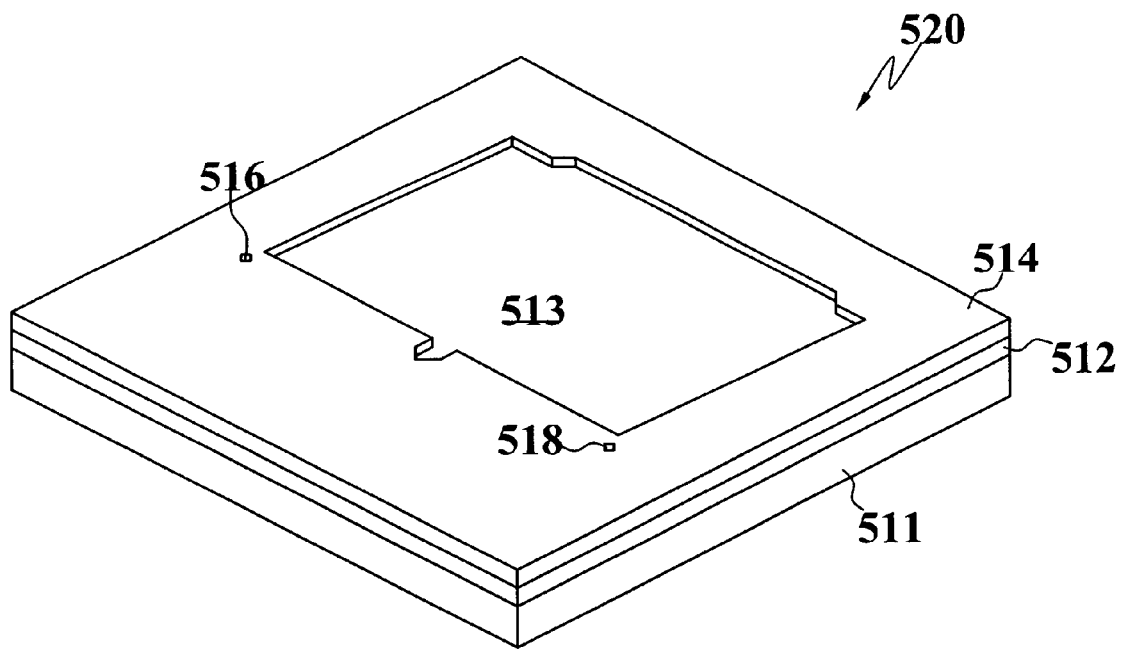
FIG. 5B illustrates an isometric perspective view of a portion of a substrate after an etching step of the fabrication process of FIG. 4.

Then, at step 450, the sacrificial silicon layers are pattern etched to expose a portion of the mirror plate and to create two holes that allow subsequent layers to be attached to the optically transmissive substrate. An isometric perspective view of a portion of substrate 511 after the etching step 450 is illustrated in FIG. 5B. In particular, optically transmissive substrate 511, sacrificial layer 512, mirror plate 513, and another sacrificial layer 514 that is patterned to expose a portion of the mirror 513 are shown. Also illustrated are two holes 516 and 518 that are also pattern-etched into the sacrificial layers 512 and 514 such that subsequent layers can be deposited through holes 516 and 518 onto optically transmissive substrate 511.

In the embodiment as illustrated in FIG. 5B, a substantial portion of the mirror plate 513 is exposed such that subsequent layers can be attached thereon. However, it should be noted that it is optional to expose a substantial portion of the mirror plate 513. In another embodiment, several openings may be pattern etched through the second sacrificial layer such that subsequent layers can be attached to the mirror plate via the openings.

At step 460, a hinge-electrode laminate is deposited on top of the second sacrificial layer. Particularly, in one embodiment, the hinge-electrode laminate covers the exposed portion of the mirror plate and portions of the optically transmissive substrate through the holes formed at step 450. In the present embodiment, the hinge-electrode laminate includes a 500A layer of silicon nitride and a 500A layer of aluminum. Other metals may be substituted for the aluminum, such as titanium or titanium nitride. Other laminate materials that can function as conductors and have good mechanical properties may also be used. Other metals, which are both conductive and reflective, could be formed. Or, a conductive layer could be made out of metal, and a separate metal or non-metal reflective layer or layers (e.g. two layers with different indices of refraction) could be formed.

Figure 5C:
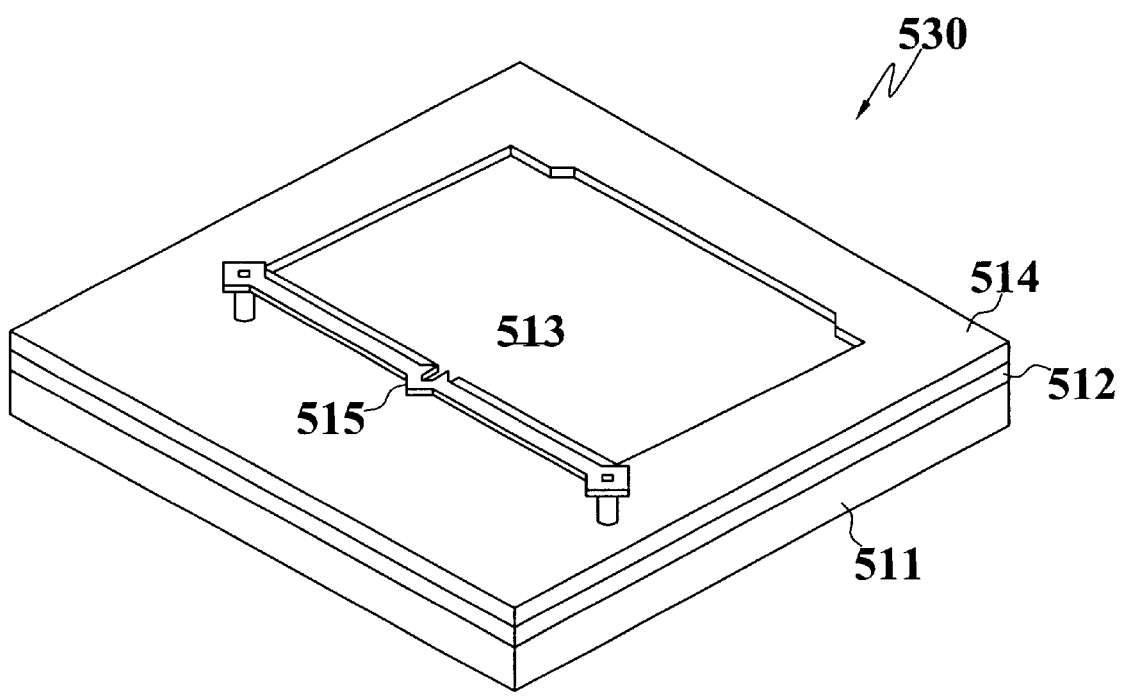
FIG. 5C illustrates an isometric perspective view of a portion of a substrate after another etching step of the fabrication process of FIG. 4.

At step 470, the hinge-electrode laminate is etched to define a mirror support structure. An isometric perspective view of a portion of substrate 511 after the etching step 470 is illustrated in FIG. 5C. Optically transmissive substrate 511, sacrificial layer 512, mirror plate 513 (not exposed), another sacrificial layer 514, and mirror support structure 515 are shown in FIG. 5C. Mirror support structure 515 as shown has an electrode portion that is attached to the mirror plate 513, and a mirror support structure that is attached to the optically transmissive substrate 511.

At step 480, the sacrificial silicon layers are etched away to release the mirror plate. The resulting micro-mirror structure is similar to micro-structure 100, and is ready to be sandwiched with a semiconductor substrate having electrodes and electronic circuitry therein to form a light valve device. The process for forming the semiconductor substrates for actuation of the micro-mirror structure is described in U.S. Pat. No. 5,835,256 and co-pending application 09/160,361, which are incorporated by reference, and is therefore not discussed herein to avoid obscuring aspects of the present invention.

Figure 7A:
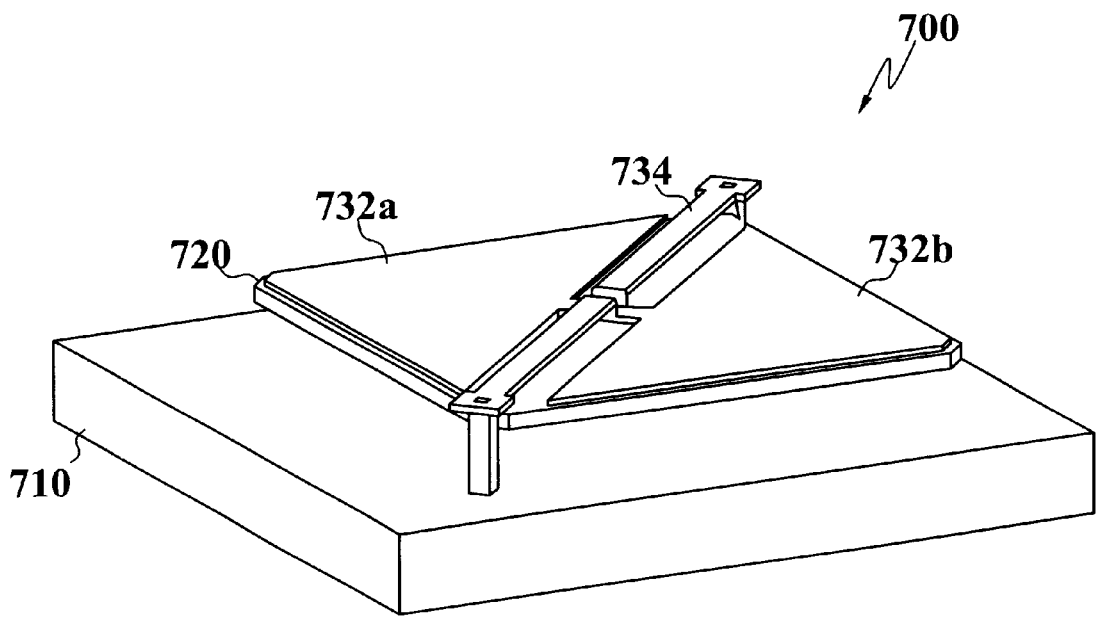
FIG. 7A illustrates an isometric perspective view of a deflectable micro-mirror structure in accordance with another embodiment of the present invention.
Figure 7B:
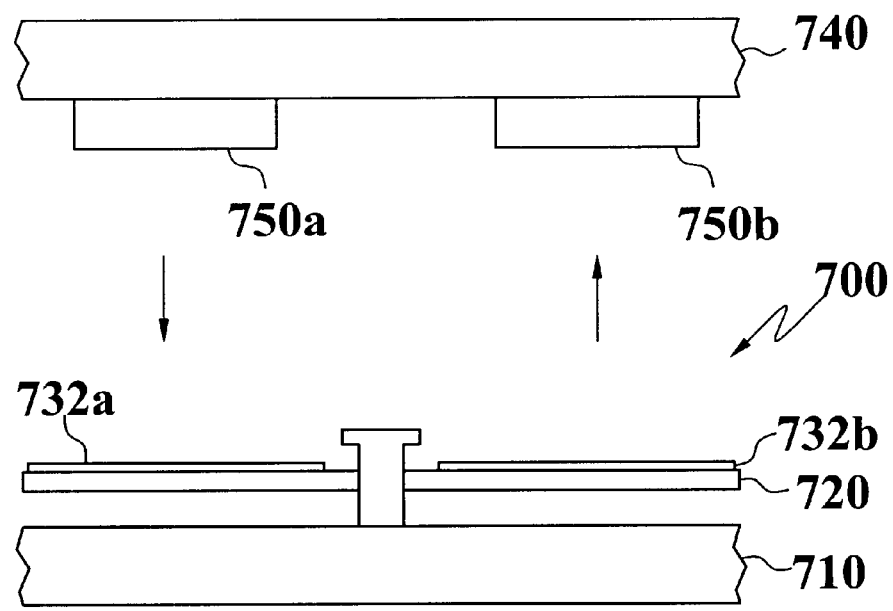
FIG. 7B illustrates a side view of the deflectable micro-mirror structure of FIG. 7A.
Figure 8:
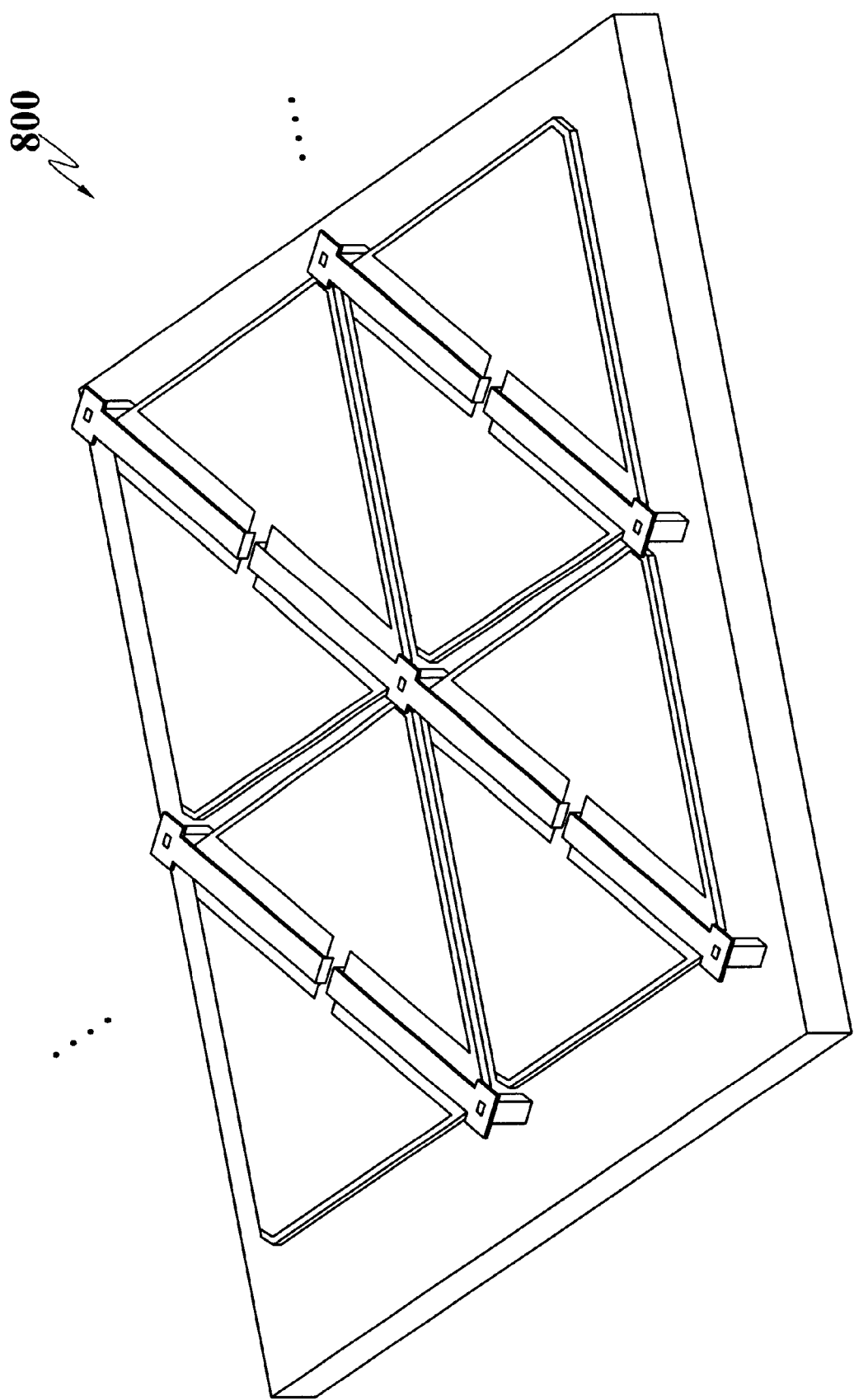
FIG. 8 illustrates an isometric perspective view of a small section of an exemplary mirror array that includes a micro-mirror structure of FIG. 7A according to one embodiment of the present invention.

FIG. 7A illustrates an isometric perspective view of a deflectable micro-mirror structure 700 in accordance with another embodiment of the present invention. FIG. 7B illustrates a side view of the deflectable micro-mirror structure 700. Deflectable micro-mirror structure 700 can be fabricated by a process similar to process 400. It should be noted that micro-mirror structure 700 is typically fabricated as part of a mirror array that may have many mirrors. For simplicity, other mirror structures of the mirror array are shown in FIGS. 7A and 7B. The mirror array may be made up of a large number of micro-mirror structures. A small section of an exemplary mirror array 800 according to the present embodiment is shown in FIG. 8.

In the present embodiment, a mirror plate 720 is suspended above, and deflectably coupled to an optically transmissive substrate 710 by means of a mirror support structure. As shown in FIG. 7A, the mirror support structure includes a torsion hinge 734 that extends diagonally across two corners of mirror plate 720. Further, torsion hinge 734 is connected to electrodes 732a and 732b that are symmetrical about the torsion hinge 734. Mirror plate 720 is attached to electrodes 732a and 732b.

With reference to FIG. 7B, electrodes 732a and 732b are aligned with electrodes 750a and 750b, respectively, of semiconductor substrate 740. According to the present embodiment, electrodes 732a and 732b are held at a constant voltage. In order to deflect mirror plate 720, a voltage bias can be applied to electrode 750a to pull the electrode 732a towards the electrode 750a, or a voltage bias can be applied to electrode 750b for pulling the electrode 732b towards the electrode 750b.

Deflection of the mirror plate 720 is stopped when one corner of the mirror plate 720 comes into contact with the optically transmissive substrate 710. In addition, the mirror plate 720 can come into contact with the torsion hinge 734. Thus, in the embodiment as shown in FIGS. 7A and 7B, the micro-mirror structure 700 is configured for resisting the deflection of the mirror plate 720 beyond a certain pre-determined tilt angle.

Figure 9:
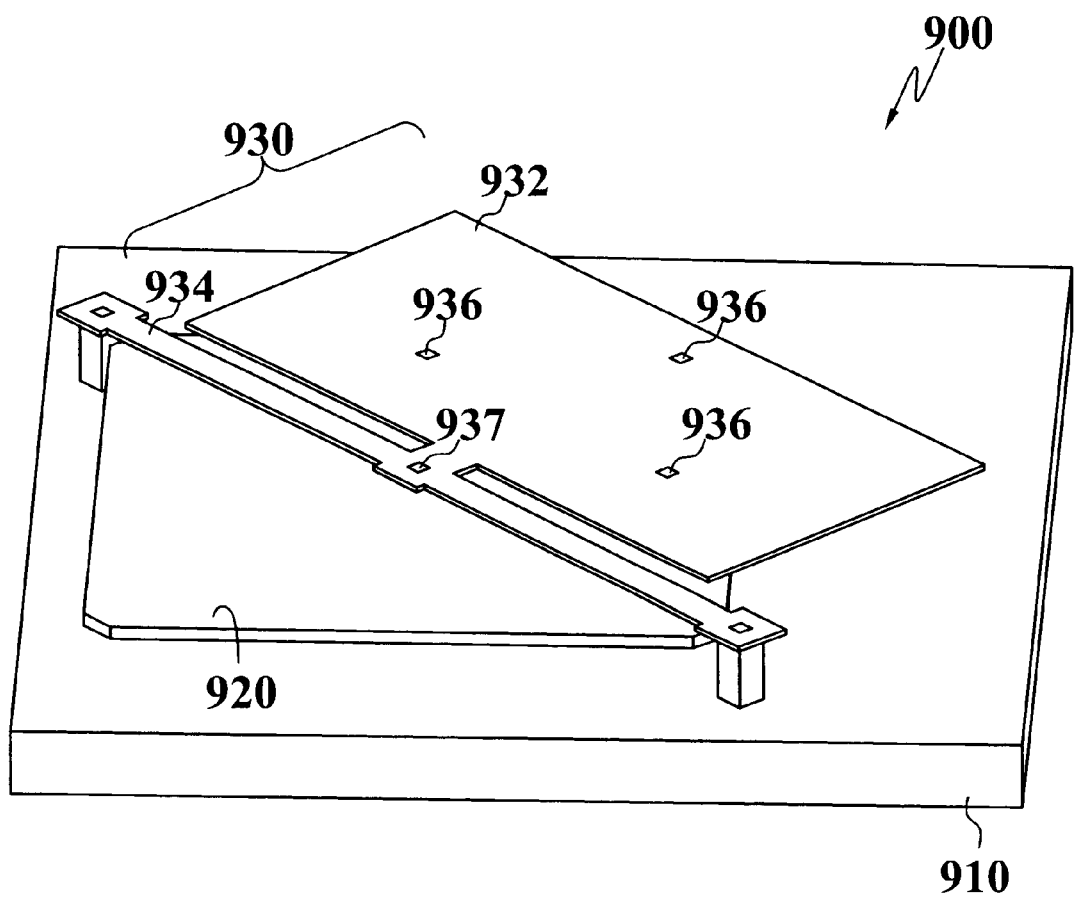
FIG. 9 illustrates an isometric perspective view of a deflectable micro-mirror structure in accordance with yet another embodiment of the present invention.
Figure 10:
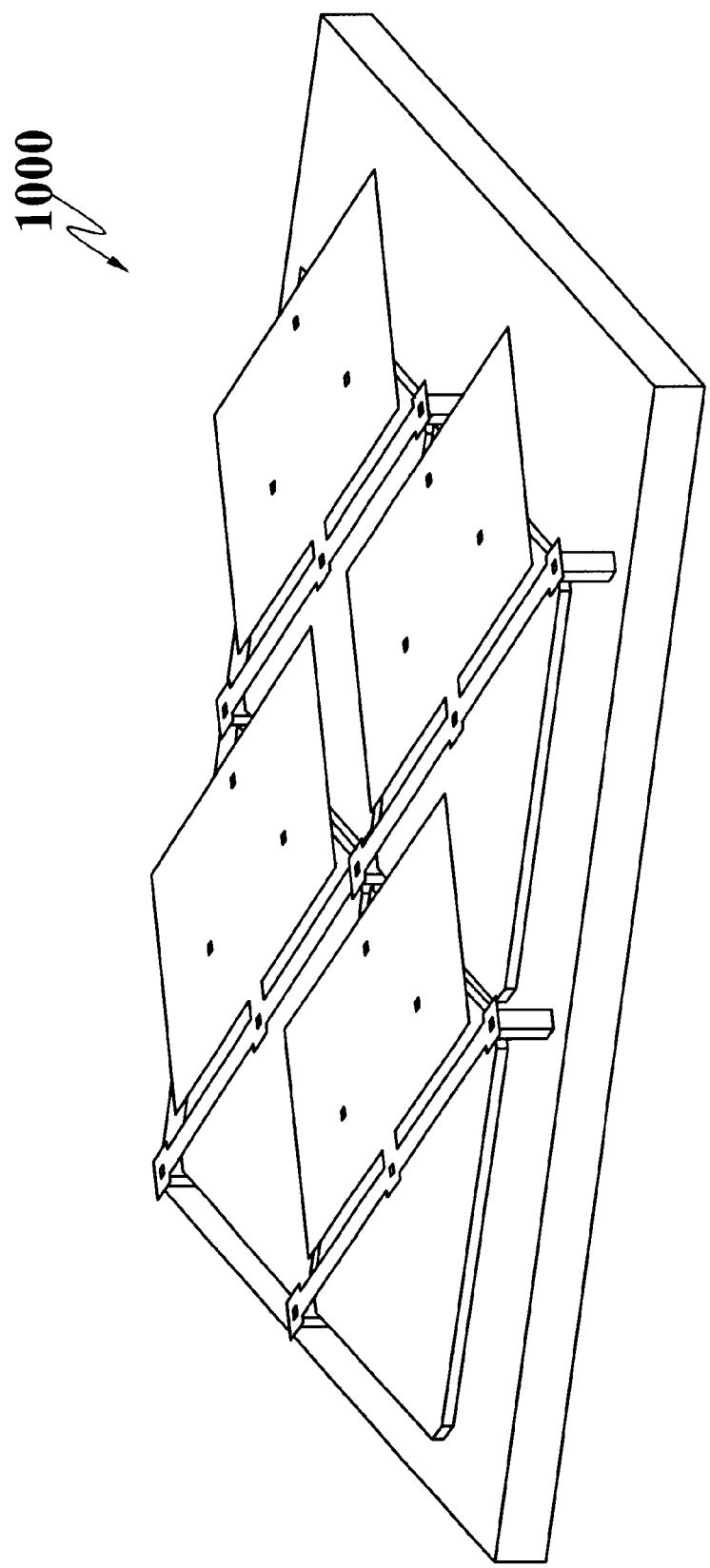
FIG. 10 illustrates an isometric perspective view of a small section of an exemplary mirror array that includes a micro-mirror structure of FIG. 9 according to one embodiment of the present invention.

FIG. 9 illustrates an isometric perspective view of a deflectable micro-mirror structure 900 in accordance with yet another embodiment of the present invention. Micro-mirror structure 900 is typically fabricated as part of a mirror array having a large number of mirrors. A small section of an exemplary micro-mirror array 1000 according to one embodiment is shown in FIG. 10.

With reference to FIG. 9, a mirror plate 920 is suspended above, and deflectably coupled to, optically transmissive substrate 910 by means of a mirror support structure 930. Mirror support structure 930 includes a torsion hinge 934 that extends across two corners of mirror plate 920. Torsion hinge 934, as shown, is attached to mirror plate 920 by means of support 937. Also illustrated in FIG. 9 is an electrode 932 that is electrically connected to and is co-planar with torsion hinge 934. Electrode 932 is attached to mirror plate 920 by means of supports 936.

Figure 11:
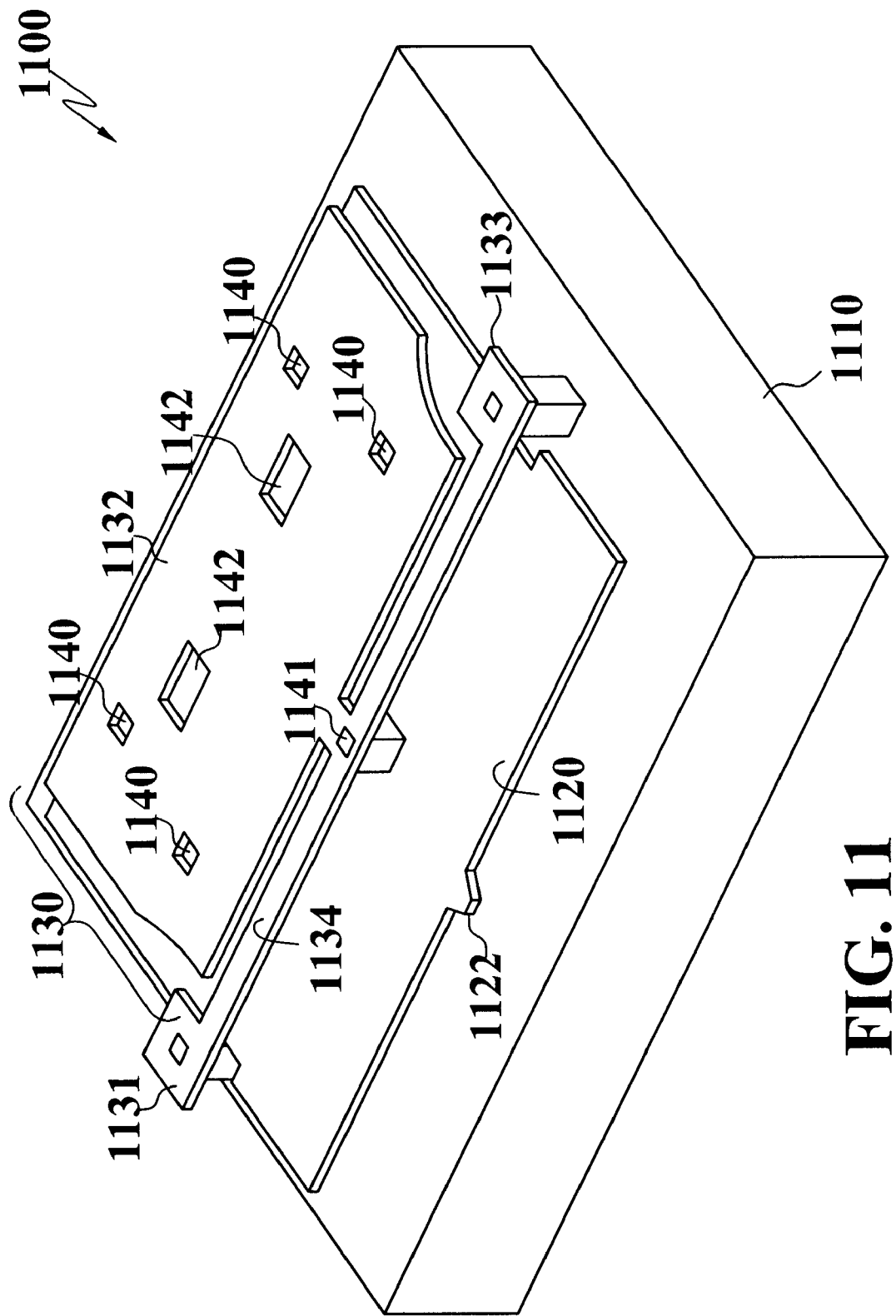
FIG. 11 illustrates an isometric perspective view of a deflectable micro-mirror structure in accordance with yet another embodiment of the present invention.

FIG. 11 illustrates a deflectable micro-mirror structure 1100 in accordance with yet another embodiment of the present invention. In the embodiment as shown in FIG. 11, a mirror plate 1120 of micro-mirror structure 1100 is suspended above, and deflectably coupled to, optically transmissive substrate 1110 by means of a mirror support structure 1130. Mirror plate 1120 has a reflective front surface that faces optically transmissive substrate 1110, and a back surface that faces the actuating circuitry substrate. In one embodiment, mirror plate 1120 is substantially rigid and may be made up of a laminate having layers of silicon nitride and aluminum.

With reference still to FIG. 11, mirror support structure 1130 includes two hinge supports 1136 and 1138 attached to the optically transmissive substrate 1110. The mirror support structure 1130 also includes a torsion hinge 1134 that extends across and attaches to the back surface of mirror plate 1120 by means of support 1141. Also attached to the back surface of mirror plate 1120 is an electrode 1132. In the embodiment as illustrated, electrode 1132 is co-planar with torsion hinge 1134, and is attached to mirror plate 1120 by means of supports 1140. In the present embodiment, supports 1140 and 1141 are formed by first pattern etching a sacrificial layer of silicon to create holes that reach down to the mirror plate 1120, and then depositing a hinge-electrode laminate over the holes. Electrode 1142 also includes openings 1132 for facilitating the removal of sacrificial materials that are beneath the electrode 1132 during the fabrication process.

Also illustrated in FIG. 11 are deflection stoppers 1131 and 1133 that are configured for resisting deflection of mirror plate 1120 beyond a pre-determined tilt angle. Particularly, when mirror plate 1120 is deflected to a pre-determined tilt angle, part of mirror plate 1120 can come into contact with deflection stoppers 1131 and 1133. In addition, in the present embodiment, micro-mirror structure 1100 can be configured such that, when mirror plate 1120 comes into contact with deflection stoppers 1131 and 1133, one edge of mirror plate 1120 will come into contact with optically transmissive substrate 1110. In the illustrated embodiment, mirror plate 1120 includes bump 1122 positioned along the substrate-touching edge such that the area of contact between mirror plate 1120 and substrate 1110 is reduced, thus reducing contact forces.

In the embodiments shown, there are dual stopping mechanisms whereby the deflectable element is stopped by two different types or abutments. In one example, the deflectable element abuts against the optically transmissive substrate at one or more locations. In addition, the deflectable element abuts against a post and hinge assembly (whether before, after, or at the same time as abutting against the optically a transmissive substrate). However, it should be noted that the two stopping mechanisms need not be provided together. A single stopping mechanism, where a portion of the hinge and post assembly stops the pivoting of the deflectable element, can be sufficient. Or, a post and lip assembly separate from the hinge can alone stop the deflectable element, or be used as a backup stop to (or together with) the abutment of the deflectable element against the optically transmissive substrate.

Figure 12:
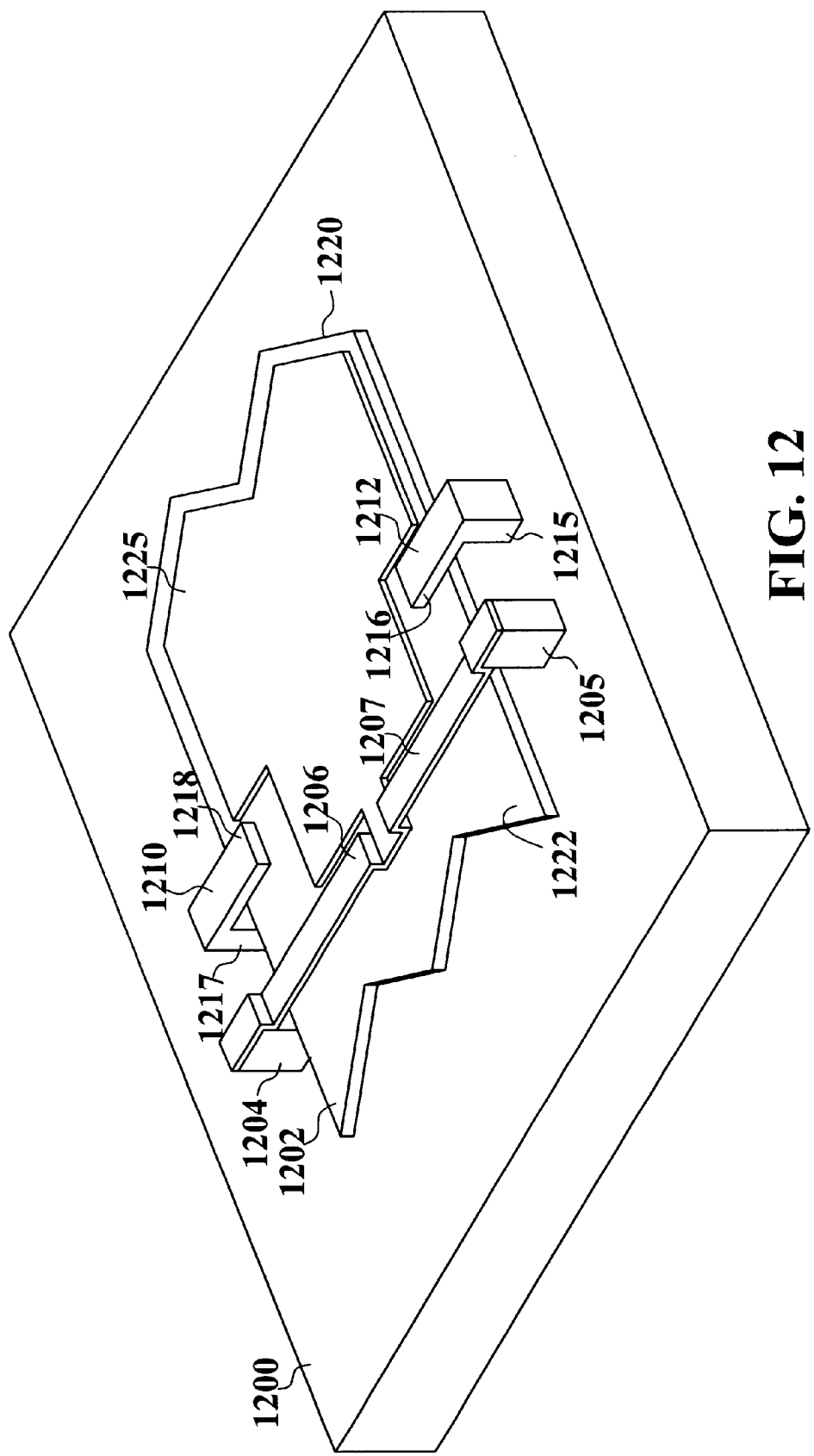
FIG. 12 illustrates an embodiment of the invention where deflection stopping mechanisms are provided separate from the post and hinge assembly.
Figure 13:
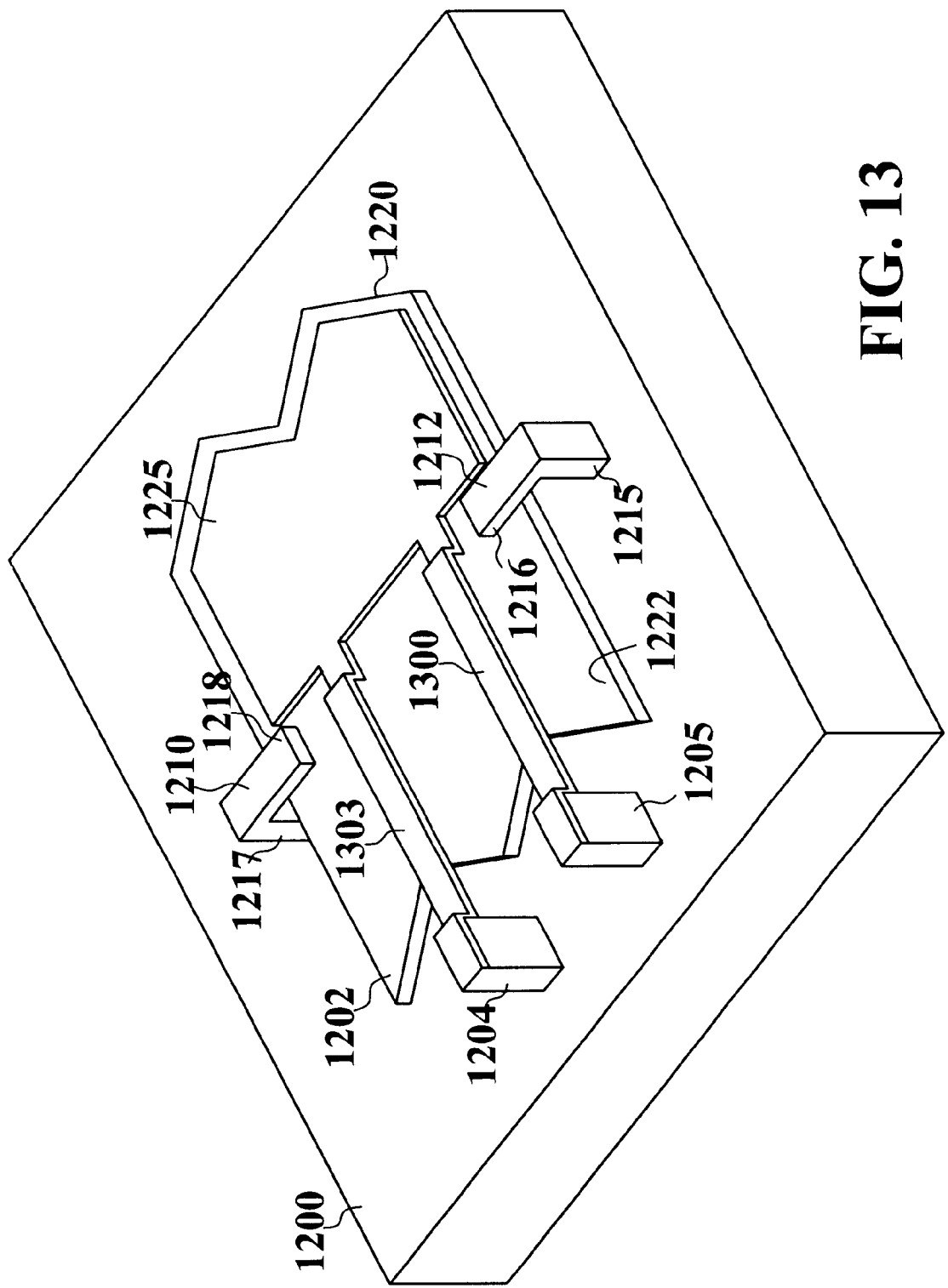
FIG. 13 illustrates an embodiment similar to that shown in FIG. 12, with leaf hinges instead of torsion hinges.

As can be seen in FIG. 12, deflectable element 1202 can be pivotably held on optically transmissive substrate 1200 by means of posts 1204, 1205 and hinges 1206, 1207. As can be seen in FIG. 12, deflection stoppers 1210, 1212 are not provided as part of the post and hinge assembly, but rather are separately provided spaced apart from the posts and hinges. The deflection stoppers are made of posts 1215, 1217 and corresponding lips or protrusions 1216, 1218. In operation, a first portion 1222 of deflectable element 1202 pivots towards the optically transmissive substrate 1200 as a second portion 1220 pivots away from the optically transmissive substrate (due to electrostatic attraction of electrode 1225 to an opposing electrode on a circuit substrate (not shown). The deflectable element can be constructed to abut against deflection stoppers 1210, 1212 before, after, or at the same time as the first portion of the deflectable element comes into contact with the optically transmissive substrate (or the deflection stoppers alone may be used to stop the deflection of the deflectable element). FIG. 13 is a similar embodiment to that illustrated in FIG. 12 (with like numerals identifying like structural elements), except that leaf hinges 1300, 1303 take the place of the torsion hinges in FIG. 12.

The present invention is also able to achieve a controlled tilt of each mirror in the array. This control is made possible by the stopping mechanisms for each mirror as mentioned above. The plurality of stopping mechanisms can be constructed so as to abut the corresponding mirror at the same time. Or, a back-up stopping mechanism could be provided in the event that the mirror is not sufficiently stopped by the primary mechanism. In this way, the degree of tilt of each mirror is more accurately controlled, thus resulting in long term accurate resolution and contrast ratio.

Accordingly, the mirror support structure is reinforced with deflection stoppers configured for resisting deflection of the reflective element beyond a pre-determined tilt angle. The deflection stoppers can be configured such that, when the reflective element is deflected to the pre-determined tilt angle, the reflective element can come into contact with the deflection stoppers. In addition, one end of the reflective element can come into contact with the optically transmissive substrate. In this way, mechanical robustness of the mirror support structure is significantly improved. Moreover, contrast of the spatial light modulator is increased due to a greater ability to control the tilt angle of the reflective elements. The reflective element of the present embodiment may also include bump(s) positioned along a substrate-touching edge such that the area of contact between the reflective element and the substrate is reduced.

In one embodiment, the mirror support structure and the attraction electrode are composed of a same conductive laminate. Therefore, the reflective element needs not be conductive (though the reflective element, in another embodiment, can be conductive and act as the electrode). Consequently, mechanical and reflective properties of the reflective element can be optimized without regard to conductivity. Also, the stopping mechanism can be disposed on a side of the reflective element opposite to that of the substrate, and the support structure preferably comprises hinges and posts, the posts extending past the reflective element to connect directly or indirectly to the substrate, and each hinge extending from the posts and connecting to the reflective element.

The primary and secondary stopping mechanisms can be constructed to stop movement of the deflectable element at different angles of deflection of the deflectable element, and may be constructed in different planes relative to the deflectable element. One of the primary and secondary stopping mechanisms preferably comprises a portion or extension of the deflectable element which abuts against the first substrate during deflection of the deflectable element, and the other of the primary and secondary stopping mechanisms preferably comprises support structure connected to the first substrate which is disposed on a side of the deflectable element opposite to the side on which the first substrate is disposed, the deflectable element adapted to abut against the support structure when the deflectable element is deflected. The secondary stopping mechanism preferably comprises a portion of the hinge, the hinge portion constructed so as to abut against the deflectable element when the deflectable element is deflected, and a gap is disposed between the first substrate and the deflectable element, and a second gap is disposed between the deflectable element and one of the primary and secondary stopping mechanisms. Also, one of the primary and secondary stopping mechanisms comprises a post or wall connected at one end to the first substrate and having a second end with a protrusion which is adapted to abut against the deflectable element when the deflectable element pivots up to a predetermined angle, whereas the secondary stopping mechanism is constructed to avoid abutment against the deflectable element unless the primary stopping mechanism fails.

In one embodiment of this aspect of the invention, a spatial light modulator is provided comprising a first substrate, a deflectable element pivotably held on the first substrate, a post or wall extending from the first substrate and having a lip or protrusion which extends past a portion of the deflectable element such that when the deflectable element pivots, a portion of the deflectable element abuts against the lip or protrusion so as to stop the movement of the deflectable element. In another embodiment, a spatial light modulator comprises in cross section, an optically transmissive substrate, a first gap disposed below the optically transmissive substrate, a pivotable mirror disposed below the first gap, a second gap disposed below the mirror, and a deflection stopper disposed below the second gap. Also provided is a connector which connects the pivotable mirror with the optically transmissive substrate, the connector preferably comprising the deflection stopper. The deflection stopper may be part of a hinge and post assembly for pivotably holding the mirror to the optically transmissive substrate, or, the hinge and post assembly can be spaced apart from the deflection stopper with the hinge disposed below the second gap. The deflection stopper can comprise a protrusion which extends below the second gap and a wall or post which connects to the optically transmissive substrate.

It should be appreciated that the present invention has been described with specific references. However, it should be noted that specific references within the present disclosure should not be construed to limit the scope of the present invention. Rather, the scope of the present invention should be construed according to the below claims.

What is claimed is:

1. A spatial light modulator, comprising in cross section, from top to bottom:
   an optically transmissive substrate;
   a first gap below the optically transmissive substrate;
   a deflectable element below the first gap;
   a second gap below the deflectable element; and
   a hinge below the second gap.

2. The spatial light modulator of claim 1, wherein the hinge comprises a flexible portion, the flexible portion being hidden from view by the deflectable element when viewed via the optically transmissive substrate.

3. The spatial light modulator of claim 1, wherein both the optically transmissive substrate and the deflectable element have top and bottom surfaces, and wherein the hinge is connected to the bottom surfaces of both the optically transmissive substrate and the deflectable element.

4. The spatial light modulator of claim 3, wherein the hinge is connected to the optically transmissive substrate via posts that extend from the bottom surface of the optically transmissive substrate and past the deflectable element.

5. The spatial light modulator of claim 4, wherein the hinge comprises a flexible portion that is connected to the posts and which extends across the deflectable element and is connected to the bottom surface of the deflectable element.

6. The spatial light modulator of claim 1, further comprising a circuit substrate positioned below and spaced apart from the optically transmissive substrate.

7. The spatial light modulator of claim 1, wherein the deflectable element is held on a bottom surface of the optically transmissive substrate, and wherein the deflectable element has first and second portions such that during deflection of the deflectable element, the second portion of the deflectable element moves towards the bottom surface as the first portion moves away from the bottom surface.

8. The spatial light modulator of claim 7, wherein said circuit substrate comprises an electrode for creating attraction between the deflectable element and the circuit substrate.

9. The spatial light modulator of claim 1, wherein the hinge extends across the deflectable element between the electrode and the deflectable element and connects to the deflectable element towards a center part of the deflectable element.

10. The spatial light modulator of claim 7, further comprising addressing circuitry formed in the circuit substrate and an electrode connected to the addressing circuitry, wherein the electrode is positioned to selectively deflect the deflectable element when a bias voltage is applied between the electrode and the deflectable element.

11. The spatial light modulator of claim 10, wherein the modulator is configured so that when a first electrical potential difference is applied between the deflectable element and the electrode, the deflectable element moves to a deflected position and remains in the deflected position until a second electrical potential difference is applied between the deflectable element and the electrode.

12. The spatial light modulator of claim 1, wherein the deflectable element includes a conductive layer.

13. The spatial light modulator of claim 12, wherein the deflectable element is reflective.

14. The spatial light modulator of claim 1, wherein the deflectable element is substantially rigid and the hinge is flexible.

15. The spatial light modulator of claim 1, wherein the hinge is a torsion hinge.

16. The spatial light modulator of claim 7, wherein the second portion of the deflectable element is constructed so as to abut against the optically transmissive substrate to thereby limit deflection of the deflectable element.

17. A spatial light modulator, comprising:
   an optically transmissive substrate having thereon a deflectable element, the deflectable element comprising a hinge which is disposed on a side of the deflectable element opposite to that of the optically transmissive substrate.

18. The spatial light modulator of claim 17, wherein the hinge comprises a flexible portion, the flexible portion being hidden from view by the deflectable element when viewed via the optically transmissive substrate.

19. The spatial light modulator of claim 17, wherein the hinge is provided flush against the deflectable element, and a gap is provided between the deflectable element and the optically transmissive substrate.

20. The spatial light modulator of claim 17, wherein both the optically transmissive substrate and the deflectable element have top and bottom surfaces, and wherein the hinge is connected to the bottom surfaces of both the optically transmissive substrate and the deflectable element.

21. The spatial light modulator of claim 20, wherein the hinge is connected to the optically transmissive substrate via posts that extend from the bottom surface of the optically transmissive substrate and past the deflectable element.

22. The spatial light modulator of claim 21, wherein the hinge comprises a flexible portion that is connected to the posts and which extends across the deflectable element and is connected to the bottom surface of the deflectable element.

23. The spatial light modulator of claim 22, wherein a gap is disposed between the flexible portion of the hinge and the deflectable element.

24. The spatial light modulator of claim 17, further comprising a circuit substrate positioned below and spaced apart from the optically transmissive substrate.

25. The spatial light modulator of claim 17, wherein the deflectable element is held on a bottom surface of the optically transmissive substrate, and wherein the deflectable element has first and second portions such that during deflection of the deflectable element, the second portion of the deflectable element moves towards the bottom surface as the first portion moves away from the bottom surface.

26. The spatial light modulator of claim 24, wherein said circuit substrate comprises an electrode for creating attraction between the deflectable element and the circuit substrate.

27. The spatial light modulator of claim 26, wherein the deflectable element comprises a reflective layer and an electrode layer which is electrically conductive, the electrode layer being spaced apart from the reflective layer.

28. The spatial light modulator of claim 26, wherein the electrode layer of the deflectable element is connected to the reflective layer via one or more posts or walls therebetween.

29. The spatial light modulator of claim 17, wherein the hinge extends across the deflectable element between the electrode and the deflectable element and connects to the deflectable element towards a center part of the deflectable element.

30. The spatial light modulator of claim 24, wherein the deflectable element is substantially rectangular or square, and wherein the hinge extends across the deflectable element along a diagonal.

31. The spatial light modulator of claim 30, wherein the modulator is configured so that when a first electrical potential difference is applied between the deflectable element and the electrode, the deflectable element moves to a deflected position and remains in the deflected position until a second electrical potential difference is applied between the deflectable element and the electrode.

32. The spatial light modulator of claim 17, wherein the deflectable element is held on the optically transmissive substrate via one or more posts, and wherein the one or more posts holds an adjacent deflectable element in the spatial light modulator.

33. The spatial light modulator of claim 31, wherein the deflectable element and/or the electrode comprise a plurality of electrodes capable of receiving different voltage biases.

34. The spatial light modulator of claim 17, wherein the deflectable element comprises a—plurality of laminated dielectric support layers.

35. The spatial light modulator of claim 17, wherein the deflectable element comprises aluminum.

36. The spatial light modulator of claim 17, wherein the deflectable element is substantially rigid and the hinge is flexible.

37. The spatial light modulator of claim 17, wherein the hinge is a torsion hinge.

38. The spatial light modulator of claim 25, wherein the second portion of the deflectable element is constructed so as to abut against the optically transmissive substrate to thereby limit deflection of the deflectable element.

39. A spatial light modulator comprising:
   an optically transmissive substrate which holds on a bottom surface thereof at least one deflectable element via a corresponding at least one torsion hinge, the deflectable element having top and bottom planar surfaces and one or more edges therebetween, the at least one torsion hinge connected to the deflectable element towards a center part of the bottom surface of the deflectable element.

40. A spatial light modulator, comprising:
   an optically transmissive substrate having a top surface and a bottom surface;
   a deflectable element having a top surface, a bottom surface and one or more edge surfaces; and
   a hinge;
   wherein the hinge is connected to the optically transmissive substrate only on the bottom surface of the optically transmissive substrate, and wherein the hinge is connected to the deflectable element only on the bottom surface of the deflectable element.

41. The spatial light modulator of claim 40, wherein the hinge comprises a flexible portion, the flexible portion being hidden from view by the deflectable element when viewed via the optically transmissive substrate.

42. The spatial light modulator of claim 41, wherein a first gap is provided between the hinge and the deflectable element, and a second gap is provided between the deflectable element and the optically transmissive substrate.

43. The spatial light modulator of claim 40, wherein both the optically transmissive substrate and the deflectable element have top and bottom surfaces, and wherein the hinge is connected to the bottom surfaces of both the optically transmissive substrate and the deflectable element.

44. The spatial light modulator of claim 43, wherein the hinge is connected to the optically transmissive substrate via posts that extend from the bottom surface of the optically transmissive substrate and past the deflectable element.

45. The spatial light modulator of claim 44, wherein the hinge comprises a flexible portion that is connected to the posts and that extends across the deflectable element and is connected to the bottom surface of the deflectable element.

46. The spatial light modulator of claim 45, wherein a gap is disposed between the flexible portion of the hinge and the deflectable element.

47. The spatial light modulator of claim 40, further comprising a circuit substrate positioned below and spaced apart from the optically transmissive substrate.

48. The spatial light modulator of claim 40, wherein the deflectable element is held on a bottom surface of the optically transmissive substrate, and wherein the deflectable element has first and second portions such that during deflection of the deflectable element, the second portion of the deflectable element moves towards the bottom surface as the first portion moves away from the bottom surface.

49. The spatial light modulator of claim 47, wherein said circuit substrate comprises an electrode for creating attraction between the deflectable element and the circuit substrate.

50. The spatial light modulator of claim 49, wherein said electrode is positioned directly below the deflectable element.

51. The spatial light modulator of claim 49, wherein the electrode is positioned below the deflectable element, and a hinge connects the deflectable element to the transparent substrate.

52. The spatial light modulator of claim 40, wherein the hinge extends across the deflectable element between the electrode and the deflectable element and connects to the deflectable element towards a center part of the deflectable element.

53. The spatial light modulator of claim 47, further comprising addressing circuitry formed in the circuit substrate and an electrode connected to the addressing circuitry, wherein the electrode is positioned to selectively deflect the deflectable element when a bias voltage is applied between the electrode and the deflectable element.

54. The spatial light modulator of claim 53, wherein the modulator is configured so that when a first electrical potential difference is applied between the deflectable element and the electrode, the deflectable element moves to a deflected position and remains in the deflected position until a second electrical potential difference is applied between the deflectable element and the electrode.

55. The spatial light modulator of claim 40, wherein the deflectable element includes a conductive layer.

56. The spatial light modulator of claim 55, wherein the deflectable element is reflective.

57. The spatial light modulator of claim 40, wherein the deflectable element comprises a structural support layer.

58. The spatial light modulator of claim 40, wherein the deflectable element comprises aluminum.

59. The spatial light modulator of claim 40, wherein the deflectable element is substantially rigid and the hinge is flexible.

60. The spatial light modulator of claim 59, wherein the hinge is a torsion hinge.

61. The spatial light modulator of claim 48, wherein the second portion of the deflectable element is constructed so as to abut against the optically transmissive substrate to thereby limit deflection of the deflectable element.

62. A spatial light modulator, comprising:
an optically transmissive substrate extending in a plane substantially horizontally;
a deflectable element extending in a plane substantially horizontally and spaced apart from and substantially parallel to the optically transparent substrate; and
a connector that allows for deflectable connection of the deflectable element to the optically transparent substrate;
wherein the connector comprises a first end attached to the optically transparent substrate, a vertical portion extending from the first end and past the plane of the deflectable element, a hinge portion extending in a plane substantially parallel to and spaced apart from the deflectable element, and a second end connecting the hinge portion to the deflectable element.

63. The spatial light modulator of claim 62, wherein the hinge comprises a flexible portion, the flexible portion being hidden from view by the deflectable element when viewed via the optically transmissive substrate.

64. The spatial light modulator of claim 62, wherein a first gap is provided between the hinge and the deflectable element, and a second gap is provided between the deflectable element and the optically transmissive substrate.

65. The spatial light modulator of claim 62, wherein both the optically transmissive substrate and the deflectable element have top and bottom surfaces, and wherein the hinge is connected to the bottom surfaces of both the optically transmissive substrate and the deflectable element.

66. The spatial light modulator of claim 65, wherein the hinge is connected to the optically transmissive substrate via posts that extend from the bottom surface of the optically transmissive substrate and past the deflectable element.

67. The spatial light modulator of claim 66, wherein the hinge comprises a flexible portion that is connected to the posts and that extends across the deflectable element and is connected to the bottom surface of the deflectable element.

68. The spatial light modulator of claim 67, wherein a gap is disposed between the flexible portion of the hinge and the deflectable element.

69. The spatial light modulator of claim 62, further comprising a circuit substrate positioned below and spaced apart from the optically transmissive substrate.

70. The spatial light modulator of claim 62, wherein the deflectable element is held on a bottom surface of the optically transmissive substrate, and wherein the deflectable element has first and second portions such that during deflection of the deflectable element, the second portion of the deflectable element moves towards the bottom surface as the first portion moves away from the bottom surface.

71. The spatial light modulator of claim 69, wherein said circuit substrate comprises an electrode for creating attraction between the deflectable element and the circuit substrate.

72. The spatial light modulator of claim 71, wherein said circuit substrate is an opaque silicon substrate.

73. The spatial light modulator of claim 72, wherein the silicon substrate is a VLSI/CMOS substrate.

74. The spatial light modulator of claim 62, wherein the hinge extends across the deflectable element between the electrode and the deflectable element and connects to the deflectable element towards a center part of the deflectable element.

75. The spatial light modulator of claim 69, further comprising addressing circuitry formed in the circuit substrate that resembles a low-density DRAM.

76. The spatial light modulator of claim 75, wherein the modulator is configured so that when a first electrical potential difference is applied between the deflectable element and the electrode, the deflectable element moves to a deflected position and remains in the deflected position until a second electrical potential difference is applied between the deflectable element and the electrode.

77. The spatial light modulator of claim 62, wherein the deflectable element comprises LPCVD-deposited silicon nitride, silicon oxide, amorphous silicon or polysilicon.

78. The spatial light modulator of claim 77, wherein the deflectable element further comprises a conductive and reflective metal layer.

79. The spatial light modulator of claim 78, wherein the deflectable element comprises a laminate support structure comprising a plurality of structural support layers disposed between the conductive and reflective metal layer and the optically transmissive substrate.

80. The spatial light modulator of claim 78, wherein the deflectable element comprises aluminum.

81. The spatial light modulator of claim 62, wherein the deflectable element is substantially rigid and the hinge is flexible.

82. The spatial light modulator of claim 62, wherein the hinge is a torsion hinge.

83. The spatial light modulator of claim 70, wherein the second portion of the deflectable element is constructed so as to abut against the optically transmissive substrate to thereby limit deflection of the deflectable element.

84. A projection display system, comprising a light source and an array of spatial light modulators according to claims 1, 17, 39, 40 or 62.

85. A method comprising the acts of:
providing a substrate;
forming a first sacrificial layer above the transparent substrate;
forming a deflectable element layer above the first sacrificial layer;
forming a second sacrificial layer above the deflectable element layer;
forming a hinge above the second sacrificial layer; and
removing the first and second sacrificial layers.

86. The method for making a spatial light modulator according to claim 85, wherein the hinge is formed to connect to both the substrate and the deflectable element layer, such that upon removal of the first and second sacrificial layers, the deflectable element is deflectably coupled to the substrate.

87. The method according to claim 86, wherein the substrate is a light transmissive substrate for allowing a light beam to pass therethrough, and the deflectable element is positioned for deflecting the light beam.

88. The method according to claim 85, further comprising the act of removing a portion of the second sacrificial layer prior to forming the hinge, such that upon forming the hinge, the hinge connects, via the removed portion, to the deflectable element.

89. The method according to claim 85, wherein the deflectable element layer comprises a reflective material.

90. The method according to claim 85, wherein the deflectable element layer comprises a light reflective and conductive layer.

91. The method according to claim 87, wherein the light transmissive substrate is glass.

92. The method according to claim 85, wherein the first and second sacrificial layers comprise silicon.

93. The method according to claim 85, wherein the hinge comprises silicon nitride.

94. The method according to claim 85, further comprising the act of patterning the deflectable element layer prior to forming the second sacrificial layer.

95. The method according to claim 94, further comprising the act of patterning the hinge prior to removal of the sacrificial layers.

96. The method according to claim 85, wherein the sacrificial layers are removed with a noble gas fluoride and/or a halogen fluoride.

97. The method according to claim 85, wherein part of the sacrificial layers is removed with plasma, and a part of the sacrificial layers is removed with a non-plasma vapor etch.

98. The method according to claim 85, further comprising the act of forming a circuit substrate and bonding the circuit substrate to the substrate having the deflectable element deflectably coupled thereto.

99. The method according to claim 98, wherein a spatial light modulator is formed.

* * * * *